US012560832B2

(12) United States Patent
Srinivasan et al.

(10) Patent No.: US 12,560,832 B2
(45) Date of Patent: Feb. 24, 2026

(54) HIGH GYROTROPY PHOTONIC ISOLATORS DIRECTLY ON SUBSTRATE

(71) Applicant: Regents of the University of Minnesota, Minneapolis, MN (US)

(72) Inventors: Karthik Srinivasan, Minneapolis, MN (US); Bethanie Joyce Hills Stadler, Shoreview, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 912 days.

(21) Appl. No.: 17/605,202

(22) PCT Filed: Apr. 22, 2020

(86) PCT No.: PCT/US2020/029333
§ 371 (c)(1),
(2) Date: Oct. 20, 2021

(87) PCT Pub. No.: WO2020/219554
PCT Pub. Date: Oct. 29, 2020

(65) Prior Publication Data
US 2022/0214568 A1      Jul. 7, 2022

Related U.S. Application Data

(60) Provisional application No. 62/837,461, filed on Apr. 23, 2019.

(51) Int. Cl.
*G02F 1/095* (2006.01)
*G02B 6/122* (2006.01)
*G02B 6/42* (2006.01)

(52) U.S. Cl.
CPC ......... *G02F 1/0955* (2013.01); *G02B 6/1225* (2013.01); *G02B 6/4208* (2013.01)

(58) Field of Classification Search
CPC .... G02F 1/0955; G02B 6/1225; G02B 6/4208
See application file for complete search history.

(56) References Cited

U.S. PATENT DOCUMENTS 8,168,939 B2      5/2012  Mack et al.
11,823,879 B2 *  11/2023  Shinada ................ C23C 14/352
(Continued)

FOREIGN PATENT DOCUMENTS

CN          102485975          6/2012
CN          105220231          1/2016
(Continued)

OTHER PUBLICATIONS

Matt Hughes. What is RF Sputtering? https://web.archive.org/web/20240000000000*/https://www.semicore.com/news/92-what-is-rf-sputtering. Oct. 27, 2016. (Year: 2016).*
(Continued)

*Primary Examiner* — Collin X Beatty
(74) *Attorney, Agent, or Firm* — Fish & Richardson P.C.

(57) ABSTRACT

A method of fabricating a gyrotropic device (e.g., an optical isolator) includes: providing a substrate comprising a waveguide layer and forming an optical isolator active layer on the waveguide layer of the substrate. Forming the optical isolator active layer includes, for a specified composition of the optical isolator active layer, deriving at least one sputtering process parameter, performing sputtering of a plurality of targets according to the at least one sputtering process parameter to deposit the optical isolator active layer on the waveguide layer of the substrate, measuring an initial value of a bias voltage at a first target of the plurality of targets; and throughout deposition of the optical isolator active layer, maintaining the bias voltage at the initial value to within a predetermined threshold of the initial value.

19 Claims, 20 Drawing Sheets

(56)                    References Cited

U.S. PATENT DOCUMENTS

| | | | |
|---|---|---|---|
| 2009/0003757 A1 | 1/2009 | Mizumoto et al. | |
| 2013/0050824 A1* | 2/2013 | Iida | G02B 5/3083 |
| | | | 359/484.03 |
| 2013/0251299 A1 | 9/2013 | He et al. | |
| 2015/0261020 A1* | 9/2015 | Ju | G02B 6/12 |
| | | | 385/11 |
| 2016/0195737 A1* | 7/2016 | Nakamura | G02F 1/0102 |
| | | | 359/484.03 |
| 2017/0269395 A1 | 9/2017 | Heck et al. | |
| 2019/0018265 A1 | 1/2019 | Kolis et al. | |
| 2019/0101773 A1 | 4/2019 | Stadler et al. | |

FOREIGN PATENT DOCUMENTS

| | | | |
|---|---|---|---|
| CN | 105549154 | 5/2016 | |
| CN | 107870456 | 4/2018 | |
| CN | 108107507 | 6/2018 | |
| CN | 108483902 | 9/2018 | |
| EP | 2492379 | 8/2012 | |
| EP | 2746839 | 6/2014 | |
| JP | 2003241141 A * | 8/2003 | G02B 6/4208 |
| KR | 20180079009 | 7/2018 | |
| WO | WO 2017019746 | 2/2017 | |
| WO | WO 2017160420 | 9/2017 | |
| WO | WO 2021076627 | 4/2021 | |

OTHER PUBLICATIONS

Matt Hughes. What is DC Sputtering? https://web.archive.org/web/20240000000000*/https://www.semicore.com/news/94-what-is-dc-sputtering. Nov. 26, 2016. (Year: 2016).*

Dolendra Karki et al. Thin-film magnetless Faraday rotators for compact heterogeneous integrated optical isolators. J. Appl. Phys. 121, 233101 (2017) (Year: 2017).*

Ando et al., "Waveguide Magneto-optic Isolator Fabricated by Laser Annealing," Appl. Phys. Letters, Jul. 4, 1988, 53(1):4-6.

Bi et al., "On-Chip Optical Isolation in Monolithically Integrated Non-Reciprocal Optical Resonators," Nat. Photonics, Nov. 13, 2011, 5(12):758-762.

Bie et al., "A MoTe2-Based Light-Emitting Diode and Photodetector for Silicon Photonic Integrated Circuits," Nat. Nanotechnology, Dec. 2017, 12(12):1124-1129.

Block et al., "Growth Parameters of Fully Crystallized YIG, Bi:YIG, and Ce:YIG Films With High Faraday Rotations," IEEE Photonics Journal, Feb. 2014, 6(1):0600308, 9 pages.

Bogaerts et al., "Basic Structures for Photonic Integrated Circuits in Silicon-on-Insulator," Opt. Express, Apr. 19, 2004, 12(8):1583-1591.

Chang et al., "Thin Film Wavelength Converters for Photonic Integrated Circuits," Optica, May 2016, 3(5):531-535.

Crossley et al., "Faraday Rotation in Rare-Earth Iron Garnets," Phys. Review, May 1969, 181(2):896-904.

Dai et al., "Passive Technologies for Future Large-Scale Photonic Integrated Circuits on Silicon: Polarization Handling, Light Non-Reciprocity and Loss Reduction," Light Sci. Applications, Mar. 29, 2012, 1:e1, 12 pages.

Dai et al., "Silicon Mode (de)Multiplexer Enabling High Capacity Photonic Networks-on-Chip with a Single-Wavelength-Carrier Light," Opt. Letters, May 1, 2013, 38(9):1422-1424.

Dillon Jr., "Origin and Uses of the Faraday Rotation in Magnetic Crystals," J. Appl. Physics, 1968, 39(2): 922-929.

Doerr et al., "Silicon photonics broadband modulation-based isolator," Opt. Express, Feb. 20, 2014, 22(4):4493-4498.

Dong et al., "Monolithic Silicon Photonic Integrated Circuits for Compact 100 +GB/s Coherent Optical Receivers and Transmitters," IEEE J. Sel. Top. Quantum Electronics, Jul./Aug. 2014, 20(4):6100108, 8 pages.

Dötsch et al., "Applications of Magneto-Optical Waveguides in Integrated Optics: Review," J. Opt. Soc. Am. B, Jan. 2005, 22(1):240-253.

Dulal et al., "Optimized Magneto-Optical Isolator Designs Inspired by Seedlayer-Free Terbium Iron Garnets with Opposite Chirality," ACS Photonics, Sep. 7, 2016, 3(10):1818-1825.

Dulal et al., "Sputter-Deposited Seedlayer-Free Cerium-Doped Terbium Iron Garnets for SOI Waveguide Isolators," Presented at Proceedings of 2016 IEEE Photonics Conference (IPC), Waikoloa, HI, USA, Oct. 2-6, 2016; 2016 IEE Photonics Conference (IPC), Oct. 2016, WP49:773-774.

EdmundOptics.com [online], "Free-Space Optical Isolators," available on or before Dec. 30, 2018 via Internet Archive: Wayback Machine URL<https://web.archive.org/web/20181230124440/https://www.edmundoptics.com/f/free-space-optical-isolators/33067/>, retrieved on Mar. 29, 2022, retrieved from URL<https://www.edmundoptics.com/f/free-space-optical-isolators/33067/>, 1 page.

EOTech.com [online], "Free Space Optical Isolators," available on or before Oct. 27, 2014 via Internet Archive: Wayback Machine URL<https://web.archive.org/web/20141027030439/https://www.eotech.com/cart/category2/free-space-optical-isolators>, retrieved on Mar. 29, 2022, retrieved from URL<https://web.archive.org/web/20141027030439/https://www.eotech.com/cart/category2/free-space-optical-isolators>, 3 pages.

Fratello et al., "Chapter 3—Epitaxial Garnet Films for Nonreciprocal Magneto-Optic Devices," Handbook of Thin Film Devices, 2000, 4:93-141.

Fratello et al., "Innovative Improvements in Bismuth-Doped Rare-Earth Iron Garnet Faraday Rotators," IEEE Trans. Magnetics, Sep. 1996, 32(5):4102-4107.

Gage et al., "Si-Integrated Ultrathin Films of Phase-Pure Y3Fe5O12 (YIG) via Novel Two-Step Rapid Thermal Anneal," Mater. Res. Letters, Mar. 1, 2017, 5(6):379-385.

Ghosh et al., "Compact Mach-Zehnder Interferometer Ce:YIG/SOI Optical Isolators," IEEE Photonics Technol. Letters, Sep. 15, 2012, 24(18):1653-1656.

Ghosh et al., "Optical Isolator for TE Polarized Light Realized by Adhesive Bonding of Ce: YIG on Silicon-on-Insulator Waveguide Circuits," IEEE Photonics Journal, Jun. 2013, 5(3):6601108, 9 pages.

Gomi et al., "Strong Magneto optical Enhancement in Highly Ce substituted Iron Garnet Films Prepared by Sputtering," J. Appl. Physics, Dec. 1, 1991, 70(11):7065-7067.

Goto et al., "Magneto-optical properties of cerium substituted yttrium iron garnet films with reduced thermal budget for monolithic photonic integrated circuits," Opt. Express, Dec. 17, 2012, 20(27):28507-28517.

Goto et al., "Vacuum annealed cerium-substituted yttrium iron garnet films on non-garnet substrates for integrated optical circuits," J. Appl. Physics, Apr. 10, 2013, 113(17):17A939, 3 pages.

Guillot et al., "Faraday Rotation of Bismuth Substituted Terbium Iron Garnets," IEEE Trans. Magnetics, Nov. 1994, 30(6):4419-4421.

Hua et al., "Demonstration of a Chip-Based Optical Isolator with Parametric Amplification," Nat. Communications, Nov. 25, 2016, 7:13657, 6 pages.

Huang et al., "Electrically Driven and Thermally Tunable Integrated Optical Isolators for Silicon Photonics," IEEE J. Sel. Top. Quantum Electronics, Nov./Dec. 2016, 22(6):4403408, 8 pages.

Huang et al., "Integrated broadband Ce:YIG/Si Mach-Zehnder optical isolators with over 100 nm tuning range," Opt. Letters, Dec. 1, 2017, 42(23):4901-4904.

Huang et al., "Towards Heterogeneous Integration of Optical Isolators and Circulators with Lasers on Silicon [Invited]," Opt. Mater. Express, Sep. 1, 2018, 8(9):2471-2483.

Hutchings et al., "Faraday Polarisation Mode Conversion in Semiconductor Waveguides Incorporating Periodic Garnet Claddings," Presented at Proceedings of SPIE OPTO, San Francisco, CA, USA, Feb. 13-18, 2016; Integrated Optics: Devices, Materials, and Technologies XX, Mar. 2016, 9750:97500V, 7 pages.

Hutchings et al., "Quasi-Phase-Matched Faraday Rotation in Semiconductor Waveguides with a Magnetooptic Cladding for Monolithically Integrated Optical Isolators," IEEE Photonics Journal, Dec. 2013, 5(6):6602512, 13 pages.

(56) References Cited

OTHER PUBLICATIONS

Ishida et al., "Amorphous-Si waveguide on a garnet magneto-optical isolator with a TE mode nonreciprocal phase shift," Opt. Express, Jan. 6, 2017, 25(1):452-462.

Jalas et al., "What is—and what is not—an optical isolator," Nat. Photonics, Jul. 30, 2013, 7(8):579-582.

Karki et al., "Thin-Film Magnetless Faraday Rotators for Compact Heterogeneous Integrated Optical Isolators," J. Appl. Physics, Jun. 15, 2017, 121(23):233101, 7 pages.

Keyvaninia et al., "Demonstration of a Heterogeneously Integrated III-V/SOI Single Wavelength Tunable Laser," Opt. Express, Feb. 11, 2013, 21(3):3784-3792.

Kim et al., "Low-Voltage High-Performance Silicon Photonic Devices and Photonic Integrated Circuits Operating up to 30 GB/S," Opt. Express, Dec. 19, 2011, 19(27):26936-26947.

Komljenovic et al., "Heterogeneous Silicon Photonic Integrated Circuits," J. Light. Technology, Jan. 2016, 34(1):20-35.

Kučera, "Magneto-optics of Ce3+ doped garnets," J. Magn. Magn. Materials, Oct. 1991, 101(1-3):242-244.

Lacklison et al., "The Faraday Rotation of Bismuth Calcium Vanadium Iron Garnet," Solid State Communications, Feb. 1972, 10(3):269-272.

Lamponi et al., "Low-Threshold Heterogeneously Integrated InP/SOI Lasers with a Double Adiabatic Taper Coupler," IEEE Photonics Technol. Letters, Jan. 2012, 24(1):76-78.

LightwaveOnline.com [online], "Isolators protect fiber-optic systems and optical amplifiers," Oct. 1, 1999, retrieved on Mar. 29, 2022, retrieved from URL<https://www.lightwaveonline.com/optical-tech/transport/article/16648509/isolators-protect-fiberoptic-systems-and-optical-amplifiers>, 21 pages.

Lin et al., "Compact Dynamic Optical Isolator Based on Tandem Phase Modulators," Opt. Letters, May 1, 2019, 44(9):2240-2243.

Nagarajan et al., "Large-Scale Photonic Integrated Circuits," IEEE J. Sel. Top. Quantum Electronic, Jan./Feb. 2005, 11(1):50-65.

Newport.com [online], "Faraday Optical Isolators," available on or before Jul. 15, 2016, via Internet Archive: Wayback Machine URL<https://web.archive.org/web/20160715173521/https://www.newport.com/c/faraday-optical-isolators>, retrieved on Mar. 29, 2022, retrieved from URL<https://www.newport.com/c/faraday-optical-isolators>, 1 page.

Onbasli et al., "Integration of bulk-quality thin film magneto-optical cerium-doped yttrium iron garnet on silicon nitride photonic substrates," Opt. Express, Oct. 7, 2014, 22(21):25183-25192.

PCT International Preliminary Report on Patentability in International Appln. No. PCT/US2020/029333, dated Sep. 28, 2021, 5 pages.

PCT International Search Report and Written Opinion in International Appln. No. PCT/US2020/029333, dated Aug. 12, 2020, 7 pages.

Phillips et al., "Apodization of Chirped Quasi-Phasematching Devices," J. Opt. Soc. Am. B, Jun. 2013, 30(6):1551-1568.

Piggott et al., "Inverse Design and Demonstration of a Compact and Broadband On-Chip Wavelength Demultiplexer," Nat. Photonics, May 11, 2015, 9(6):374-377.

Pintus et al., "Microring-Based Optical Isolator and Circulator with Integrated Electromagnet for Silicon Photonics," J. Light. Technology, Apr. 15, 2017, 35(8):1429-1437.

Polytec.com [online], "Optical Isolators and Faraday-Isolators," available on or before Sep. 26, 2020, via Internet Archive: Wayback Machine URL<https://web.archive.org/web/20200926052311/https://www.polytec.com/eu/optical-systems/products/laser-and-laser-accessories/faraday-isolators/>, retrieved on Mar. 29, 2022, retrieved from URL<https://www.polytec.com/eu/optical-systems/products/laser-accessories/electro-optic-components/faraday-isolators>, 5 pages.

Shirasaki et al., "Compact Optical Isolator for Fibers Using Birefringent Wedges," Appl. Optics, Dec. 1, 1982, 21(23):4296-4299.

Shoji et al., "Magneto-optical isolator with silicon waveguides fabricated by direct bonding," Appl. Phys. Letters, Feb. 21, 2008, 92(7):071117, 4 pages.

Shoji et al., "MZI Optical Isolator with Si-Wire Waveguides by Surface-Activated Direct Bonding," Opt. Express, Jul. 30, 2012, 20(16):18440-18448.

Shoji et al., "Optical Nonreciprocal Devices Based on Magneto-Optical Phase Shift in Silicon Photonics," J. Optics, Nov. 20, 2015, 18(1):013001, 15 pages.

Shoji et al., "Waveguide Magneto-Optical Devices for Photonics Integrated Circuits [Invited]," Opt. Mater. Express, Aug. 1, 2018, 8(8):2387-2394.

Shoji et al., "Wideband Design of Nonreciprocal Phase Shift Magneto-Optical Isolators Using Phase Adjustment in Mach-Zehnder Interferometers," Appl. Optics, Sep. 20, 2006, 45(27):7144-7150.

Soref, "The Past, Present, and Future of Silicon Photonics," IEEE J. Sel. Top. Quantum Electronics, Nov./Dec. 2006, 12(6):1678-1687.

Srinivasan et al., "High-Gyrotropy Seedlayer-Free Ce:TbIG for Monolithic Laser-Matched SOI Optical Isolators," ACS Photonics, Sep. 6, 2019, 6(10):2455-2461.

Srinivasan et al., "Integrated Silicon-on-Insulator Isolators using Seedlayer-Free Garnet," Presented at Proceedings of MINT Research Review 2018, Minneapolis, MN, USA, Oct. 11, 2018, 15 pages.

Srinivasan et al., "Interfacial and Bulk Magnetic Properties of Stoichiometric Cerium Doped Terbium Iron Garnet Polycrystalline Thin Films," Adv. Funct. Materials, Apr. 14, 2020, 30(15):2000409.

Srinivasan et al., "Magnetic and Magneto-Optical Properties of Seedlayer-Free Cerium-Doped Terbium Iron Garnets," Presented at Proceedings of the 2019 Joint MMM-Intermag Conference, Washington, DC, USA, Jan. 14-18, 2019, 15 pages.

Srinivasan et al., "Magneto-Optical Materials and Designs for Integrated TE- and TM-Mode Planar Waveguide Isolators: A Review [Invited]," Opt. Mater. Express, Nov. 1, 2018, 8(11):3307-3318.

Srinivasan et al., "Novel Rare-Earth Iron Garnets on Non-Garnet Substrates: Fabrication to Application," Poster, Presented at Proceedings of the IEEE Magnetics Summer School 2018, Quito, Ecuador, Jun. 7, 2018, 1 page.

Srinivasan et al., "Seed-Layer Free Cerium-Doped Terbium Iron Garnet on Non-Garnet Substrates for Photonic Isolators", Presented at Proceedings of Conference on Lasers and Electro-Optics 2018, San Jose, CA, USA, May 13-18, 2018, 19 pages.

Srinivasan et al., "Seed-Layer Free Cerium-Doped Terbium Iron Garnet on Non-Garnet Substrates for Photonic Isolators," OSA Technical Digest, 2018, SW41.5, 2 pages.

Stadler et al., "Integrated magneto-optical materials and isolators: a review," IEEE Photonics Journal, Feb. 2014, 6(1):0600215, 16 pages.

Stadler et al., "Sputter-Deposited Magneto-Optical Garnet for All-Mode (Transverse Electric/Transverse Magnetic) Faraday Rotators," MRS Bulletin, Jun. 11, 2018, 43(6):430-435.

Stadler et al., "Sputter-deposited yttria-alumina thin films for optical waveguiding," J. Appl. Physics, Jul. 1, 1998, 84(1):93-99.

Stevens et al., "Promising Materials for High Power Laser Isolators," Laser Tech. Journal, May 2016, 13(3):18-21.

Sun et al., "Single-Step Deposition of Cerium-Substituted Yttrium Iron Garnet for Monolithic On-Chip Optical Isolation," ACS Photonics, Jun. 10, 2015, 2(7):856-863.

Sung et al., "Magneto-Optical Garnet Waveguides on Semiconductor Platforms: Magnetics, Mechanics, and Photonics," J. Appl. Physics, Mar. 31, 2011, 109(7):07B738, 4 pages.

Takei et al., "Design and Simulation of Silicon Waveguide Optical Circulator Employing Nonreciprocal Phase Shift," Jpn. J. Appl. Physics, May 20, 2010, 49(5R):052203, 7 pages.

Thomson et al., "Roadmap on Silicon Photonics," J. Optics, Jun. 24, 2016, 18(7):073003, 21 pages.

Thorlabs.com [online], "IR Fiber Optic Isolators with PM Fiber (1290-2010 nm)," available on or before Feb. 4, 2013, via Internet Archive: Wayback Machine URL<https://web.archive.org/web/20130204145904/https://www.thorlabs.com/newgrouppage9.cfm?objectgroup_id=6763>, retrieved on Mar. 29, 2022, retrieved from URL<https://www.thorlabs.com/newgrouppage9.cfm?objectgroup_id-6763>, 4 pages.

(56) References Cited

OTHER PUBLICATIONS

Welch et al., "The Realization of Large-Scale Photonic Integrated Circuits and the Associated Impact on Fiber-Optic Communication Systems," J. Light. Technology, Dec. 2006, 24(12):4674-4683.

Xia et al., "Ultracompact Optical Buffers on a Silicon Chip," Nat. Photonics, Dec. 21, 2006, 1(1):65-71.

Xu et al., "Silicon Photonic Integration Platform-Have We Found the Sweet Spot?," IEEE J. Sel. Top. Quantum Electronics, Jul./Aug. 2014, 20(4):8100217, 17 pages.

Yazaki et al., "Demonstration of Interferometric Waveguide Optical Isolator with a Unidirectional Magnetic Field," Jpn. J. Appl. Physics, 2007, 46(8S):5460-5464.

Yokoi et al., "Demonstration of an Optical Isolator by Use of a Nonreciprocal Phase Shift," Appl. Optics, 1999, 38(36):7409-7413.

Yoshida et al., "Optical Properties and Faraday Effect of Ceramic Terbium Gallium Garnet for a Room Temperature Faraday Rotator," Opt. Express, Aug. 1, 2011, 19(16):15181-15187.

Zhang et al., "Monolithic Integration of Broadband Optical Isolators for Polarization-Diverse Silicon Photonics," Optica, Apr. 2019, 6(4):473-478.

Zhang et al., "Monolithically-Integrated TE-Mode 1D Silicon-on-Insulator Isolators Using Seedlayer-Free Garnet," Sci. Reports, Jul. 19, 2017, 7:5820, 8 pages.

Zheleznov et al., "Improving characteristics of Faraday isolators based on TAG ceramics by cerium doping," Opt. Letters, Apr. 1, 2014, 39(7):2183-2186.

U.S. Appl. No. 17/768,328, filed Apr. 12, 2022, Karthik Srinivasan, Pending.

* cited by examiner

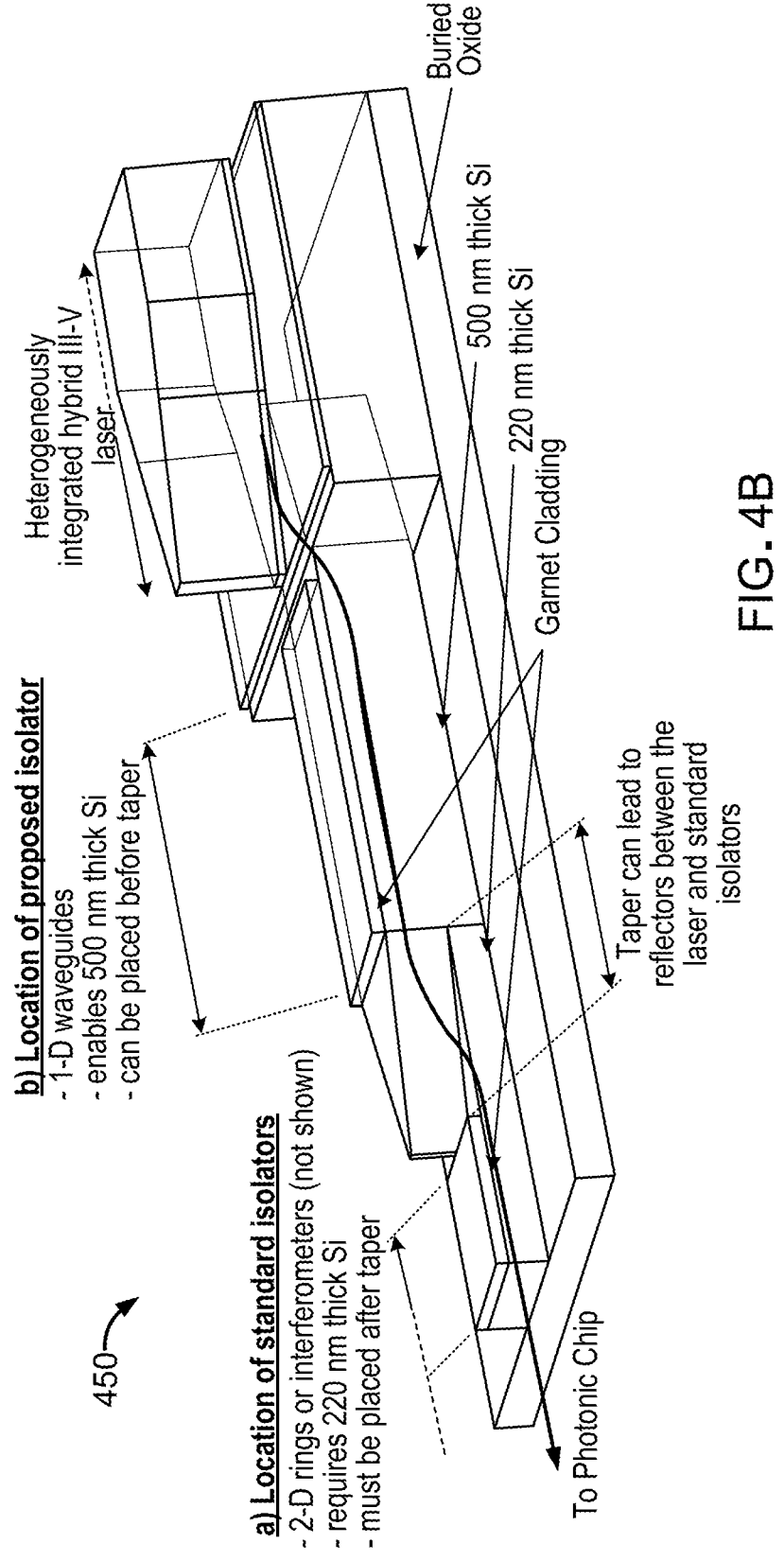

Buried Oxide

Heterogeneously integrated hybrid III-V laser 500 nm thick Si 220 nm thick Si

Garnet Cladding b) Location of proposed isolator
- 1-D waveguides
- enables 500 nm thick Si
- can be placed before taper a) Location of standard isolators
- 2-D rings or interferometers (not shown)
- requires 220 nm thick Si
- must be placed after taper Taper can lead to reflectors between the laser and standard isolators To Photonic Chip

Discharge Voltage at Cerium Sputtering Target

Discharge Voltage at Time (Min)

$y = -0.0557x^2 + 4.3595x + 64.59$
$R^2 = 0.9832$
UCL = 108
LCL = 97

$y = -0.0424x^2 + 4.004x + 66.382$
$R^2 = 0.978$
UCL = 109
LCL = 96

Discharge Voltage (V)

Fraction Substituted Cerium (Ce/Ce+Tb)

◇ 1st Minute (Const T)
■ 5th Minute (Const T)
○ 1st Minute (Constant Power & T)
✕ 5th Minute (Constant Power & T)

1500

| Garnet Cladding | $L_m$ (mm) | $\Theta$ (rad) | $d_m$ (dB) | $L_{optimal}$ (mm) |
|---|---|---|---|---|
| Bi:TbIG | 5.4 | $0.28\pi$ | 0.88 | 19.3 |
| Ce:YIG/MgO | 7 | $0.51\pi$ | 3.1 | 13.7 |
| Ce:YIG/YIG | 4.1 | $0.74\pi$ | 8.0 | 5.5 |
| Ce:TbIG | 6 | $0.816\pi$ | 10.9 | 7.35 |

FIG. 15

HIGH GYROTROPY PHOTONIC ISOLATORS DIRECTLY ON SUBSTRATE

CROSS-REFERENCE TO RELATED APPLICATIONS

This application is a National Stage application under 35 U.S.C. § 371 of International Application No. PCT/US2020/029333, having an International Filing Date of Apr. 22, 2020, which claims priority to U.S. Application No. 62/837,461, filed Apr. 23, 2019. The disclosure of the foregoing applications are hereby incorporated by reference in their entirety.

STATEMENT AS TO FEDERALLY SPONSORED RESEARCH

This invention was made with government support under DMR-1210818 and NNCI 1542202 awarded by National Science Foundation. The Government has certain rights in the invention.

TECHNICAL FIELD

This disclosure generally relates to optical isolators and methods of fabricating optical isolators.

BACKGROUND

An optical isolator is the optical analogue of an electronic diode that only allows light to propagate in a forward direction, and attenuates or blocks back reflected light that propagates in a backward direction. An optical isolator can be used to mitigate effects of back reflections such as spurious amplification, intensity instability and frequency jumps in a laser source.

A linearly polarized light beam is equivalent to the combination of two equal but opposite circularly polarized beams. When this beam is passed through a magneto-optic material under application of magnetic field, it experiences a phenomenon called Zeeman splitting—a splitting of the dispersion curves of the two polarizations. This leads to a difference in refractive index at all wavelengths to some degree, which means the two polarizations have different velocities. This difference is called the magneto-optic circular birefringence, also known as Faraday rotation, because the birefringence causes an effective rotation of the linearly polarized light. Materials exhibiting such Faraday rotation are called magneto-optic or gyrotropic materials.

Faraday rotation ($\theta_F$) depends on three different components, the magnetization of the material (M), thickness of the material (d), and a material constant called the Verdet constant (V) according to $\theta_F=VdM$. For a magnetically saturated material, Faraday rotation has units of °/cm, signifying the amount of rotation per unit propagation length in the material.

SUMMARY

The present disclosure relates to devices including optical isolators and methods for producing the same directly on a substrate. While described in the context of optical isolators, any gyrotropic device having a material with Faraday rotation is within the scope of the disclosure. In certain implementations, the disclosure features a method of fabricating a gyrotropic device or optical isolator. The method includes providing a substrate and forming an optical isolator active layer on the substrate. Forming the optical isolator active layer includes, for a specified composition of the optical isolator active layer, deriving at least one sputtering process parameter, performing sputtering of at least one target according to the at least one sputtering process parameter to deposit the optical isolator active layer on the substrate, measuring an initial value of a bias voltage at a first target of at least one target, and throughout deposition of the optical isolator active layer, maintaining the bias voltage at the initial value to within a predetermined percentage of the initial value.

In some implementations, maintaining the bias voltage at the initial value includes (a) adjusting a forward power associated with sputtering the first target of at least one target, (b) closing a shutter to prevent deposition of material from the first target on the substrate, or (c) adjusting the forward power associated with sputtering the first target and closing the shutter to prevent deposition of material from the first target on the substrate. In some implementations, the optical isolator active layer has a Faraday rotation greater than at least −3000°/cm for a predetermined wavelength of light. In some implementations, the substrate comprises a waveguide layer and the optical isolator active layer is a cladding to the waveguide layer. In some implementations, the optical isolator active layer comprises doped garnet. In some implementations, the doped garnet is a waveguide layer. In some implementations, the optical isolator active layer comprises doped terbium iron garnet. In some implementations, the terbium iron garnet is doped with cerium. In some implementations, forming the optical isolator active layer includes annealing the optical isolator active layer. In some implementations, annealing the optical isolator active layer is performed at a temperature between about 800 and about 970 degrees Celsius. In some implementations, forming the optical isolator active layer includes performing the sputtering in an oxygen environment. In some implementations, at least one target comprises a cerium target, a terbium target, and an iron target. In some implementations, at least one of the targets comprises an alloy of terbium and iron. In some implementations, at least one of the targets comprises cerium. In some implementations, the method includes forming a silicon nitride layer on the optical isolator active layer.

Another aspect of the disclosure includes a gyrotropic device or optical isolator that includes a substrate, wherein the substrate includes a waveguide layer. The optical isolator includes a doped garnet optical isolator active layer in direct contact with the waveguide layer. In some implementations, the optical isolator active layer comprises doped terbium iron garnet. In some implementations, the terbium iron garnet is doped with cerium. In some implementations, the terbium iron garnet is doped with bismuth.

Implementations of the subject matter disclosed herein may have various advantages. For example, in some implementations, the techniques disclosed herein provide improvements in the quality of material used for optical isolators. In some implementations, the techniques disclosed herein introduce a reliable, consistent and repeatable material deposition process. The solutions disclosed herein can be cost effective and foundry-friendly, and can provide isolation ratios comparable to those provided by optical isolators generated in alternative methods.

Advantageously, the disclosed device architectures can be achieved using large-area, planar processing techniques (e.g., sputtering), enabling compact, integrated form-factors and large-scale manufacturing in an economic manner. Furthermore, use of silicon substrates can enable back-end-of-line processes to be utilized in subsequent device manufacturing and packaging. This may significantly improve manufacturing efficiency over manual pick and place processes involved in many garnet devices.

A gyrotropic device having a material with a predetermined level of Faraday rotation is achieved using cerium, however fabricating such gyrotropic devices may be difficult. During fabrication, a bias voltage is monitored for controlling the cerium. If the bias voltage decreases while sputtering, the target material can be closed off to stop further deposition of the active layer until the bias voltage reaches its former level. Then the target material can be reopened again to continue making the gyrotropic film. Alternative iterative trial and error approaches (where gyrotropy is evaluated after complete deposition) can be long and arduous.

Gyrotropy is evaluated by sensing a decrease in bias voltage. The decrease in bias voltage is indicative of oxide formation, which is undesirable because it decreases the phase purity of the garnet film. Phase purity affects the Faraday rotation. An iterative approach would involve measuring the phase purity (by, for e.g., X-ray diffraction) and Faraday rotation (by, for e.g., optical measurements) for each sample. Monitoring the bias voltage allows for an accurate prediction of high Faraday rotations without the trial and error approach of an iterative process.

In certain implementations, monitoring and maintaining the bias voltage in situ (during growth) allows the fabrication process to be successful for every film the first time it is grown.

Wherever there is an on-chip laser in a photonic integrated circuit, there is a requirement for an integrated isolator. Photonic integrated circuits are envisioned as the next computing platform that brings together existing CMOS-based circuitry and speed that photonics has to offer. The presently disclosed techniques can generate optical isolators that greatly increase the computation and communication speed of computing platforms in addition to supporting very high data rates. For example, services such as cloud storage data centers, long haul communications, applications in space and defense areas, quantum computing, among others, can be improved by the disclosed method.

A material deposited on a substrate can have different atomic arrangements depending on deposition conditions such as the temperature, deposition rate, and substrate material. The deposited layer ranges from amorphous to single crystal (i.e., epitaxy). While epitaxy is a desirable arrangement, achieving epitaxy requires stringent deposition conditions, including requiring that the substrate be crystalline and the lattice of the substrate be matched with the deposited layer. A seed layer ensures adherence of the deposited layer to the substrate and offers nucleation germs to enhance the nucleation phase by inducing the desired crystallization form in the deposited layer. In general, the techniques for forming optical isolator active layers disclosed herein do not require the formation of an optical isolator seed layer. Such omission of a seed layer may be beneficial as it allows additional steps, such as resist deposition and removal, which may add complexity, points of failure, and time to the process, to be bypassed.

The details of one or more implementations of the subject matter of this disclosure are set forth in the accompanying drawings and the description below. Other features, aspects, and advantages of the subject matter will become apparent from the description, the drawings, and the claims.

4 is a plot displaying the interaction of the Faraday rotation and Stokes vector of a material.

Figure 2:
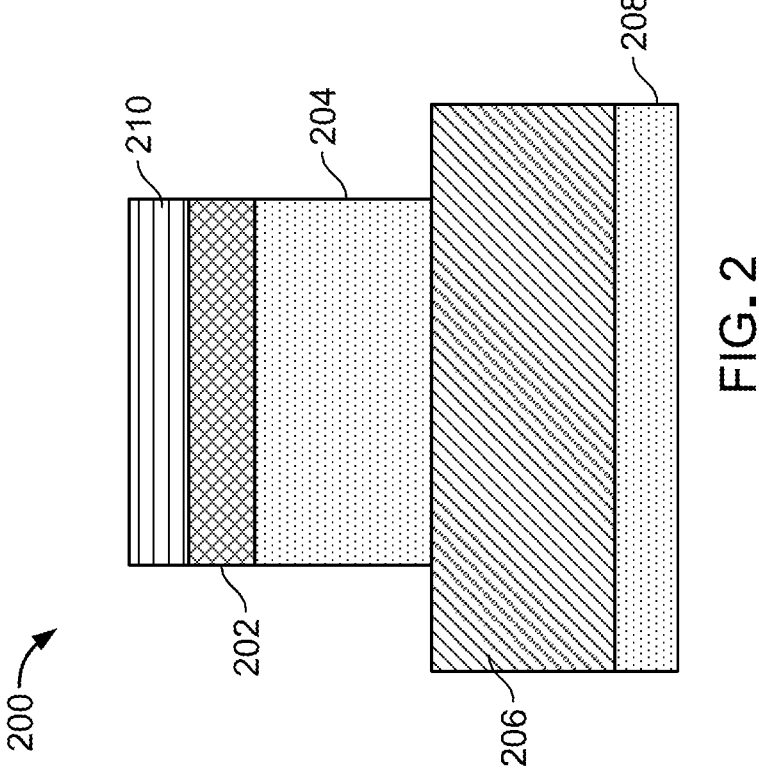

FIG. 2 is a schematic that illustrates an example of a device that applies the methods described herein.

Figure 3:
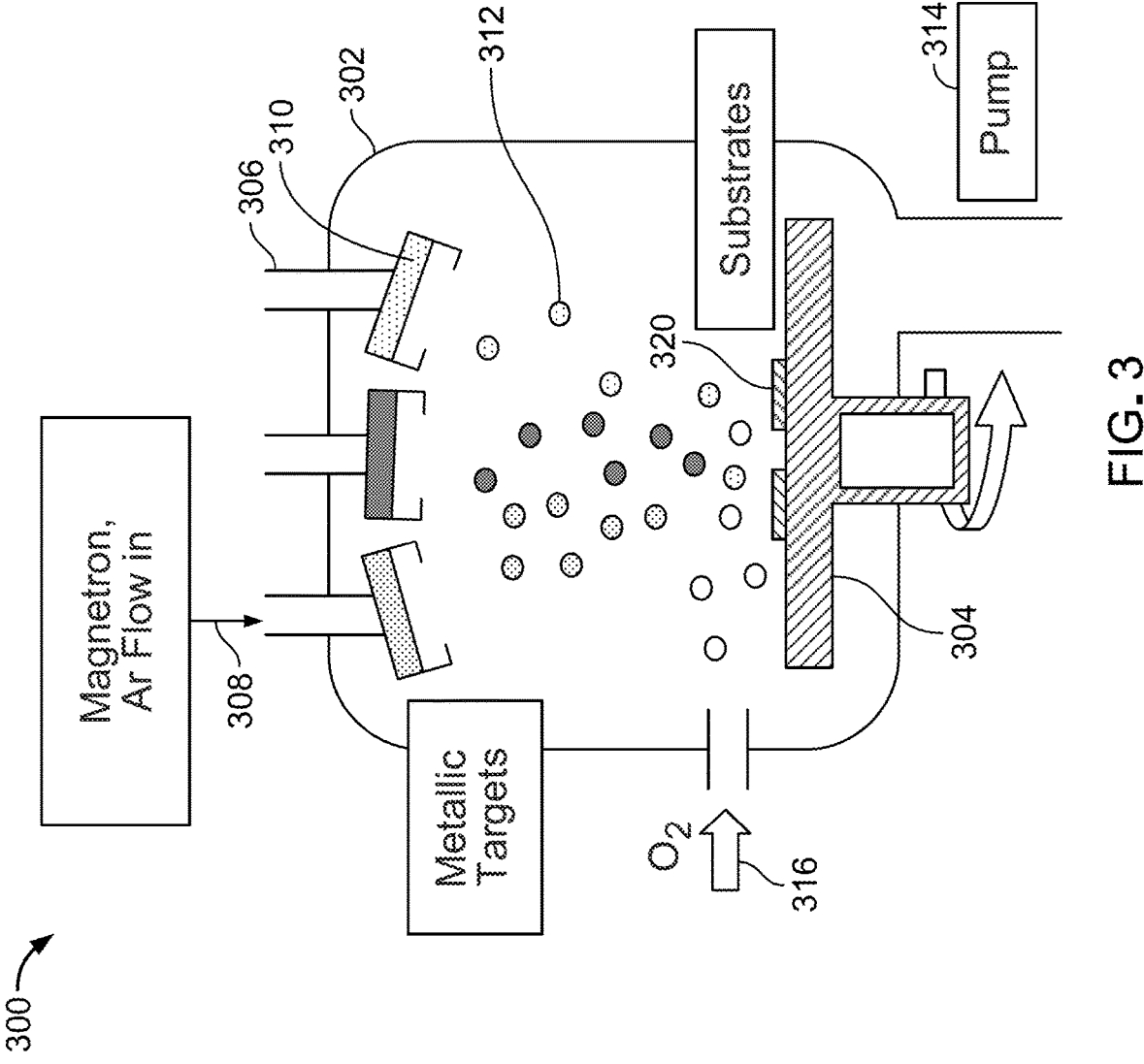

FIG. 3 is a schematic illustration of an exemplary system for performing sputtering.

Figure 4A:
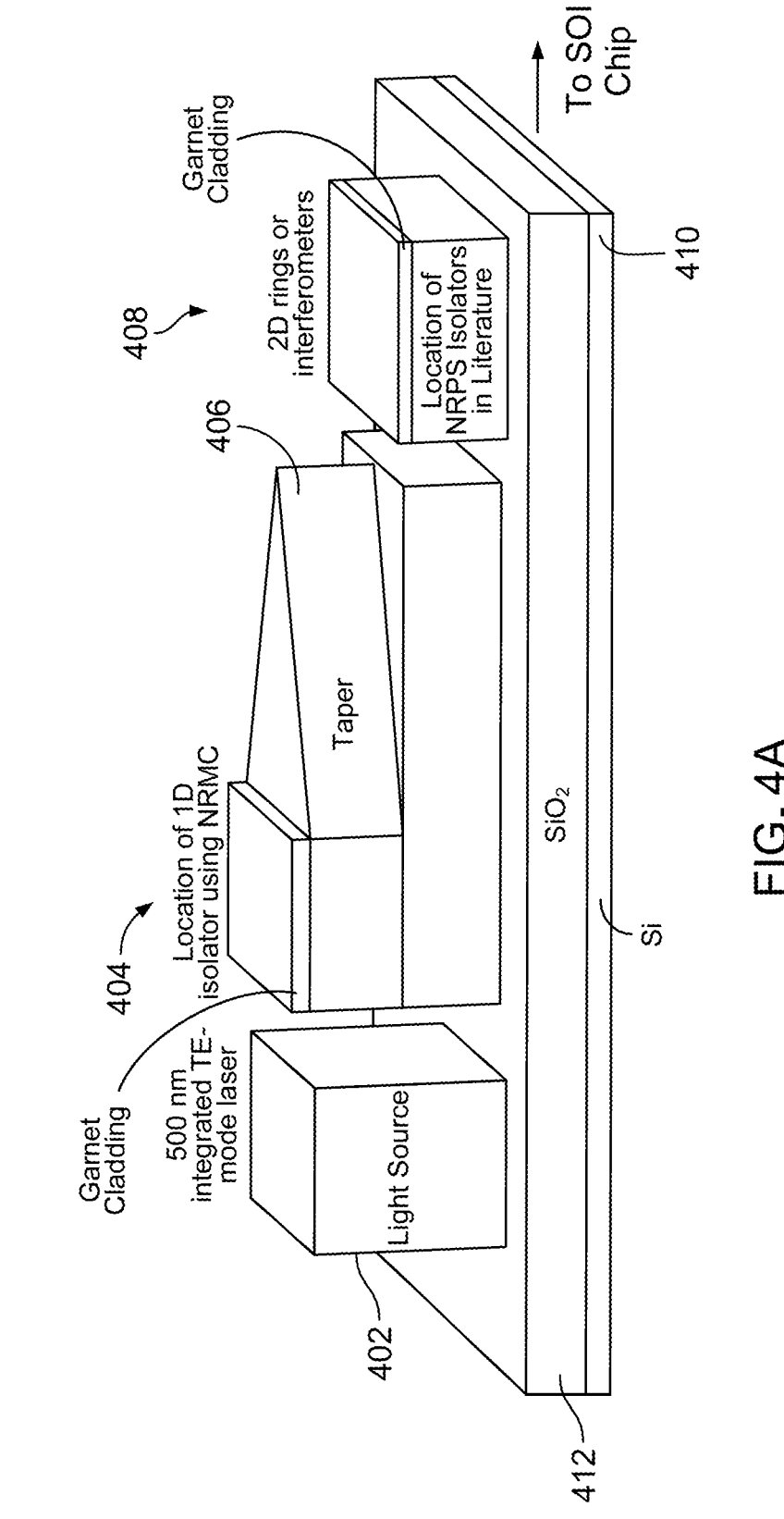

FIG. 4A is a schematic illustration of an exemplary laser source integrated with an optical isolator and interferometer.

FIG. 4B is a schematic illustration of an exemplary laser source integrated with an optical isolator and interferometer.

Figure 5:
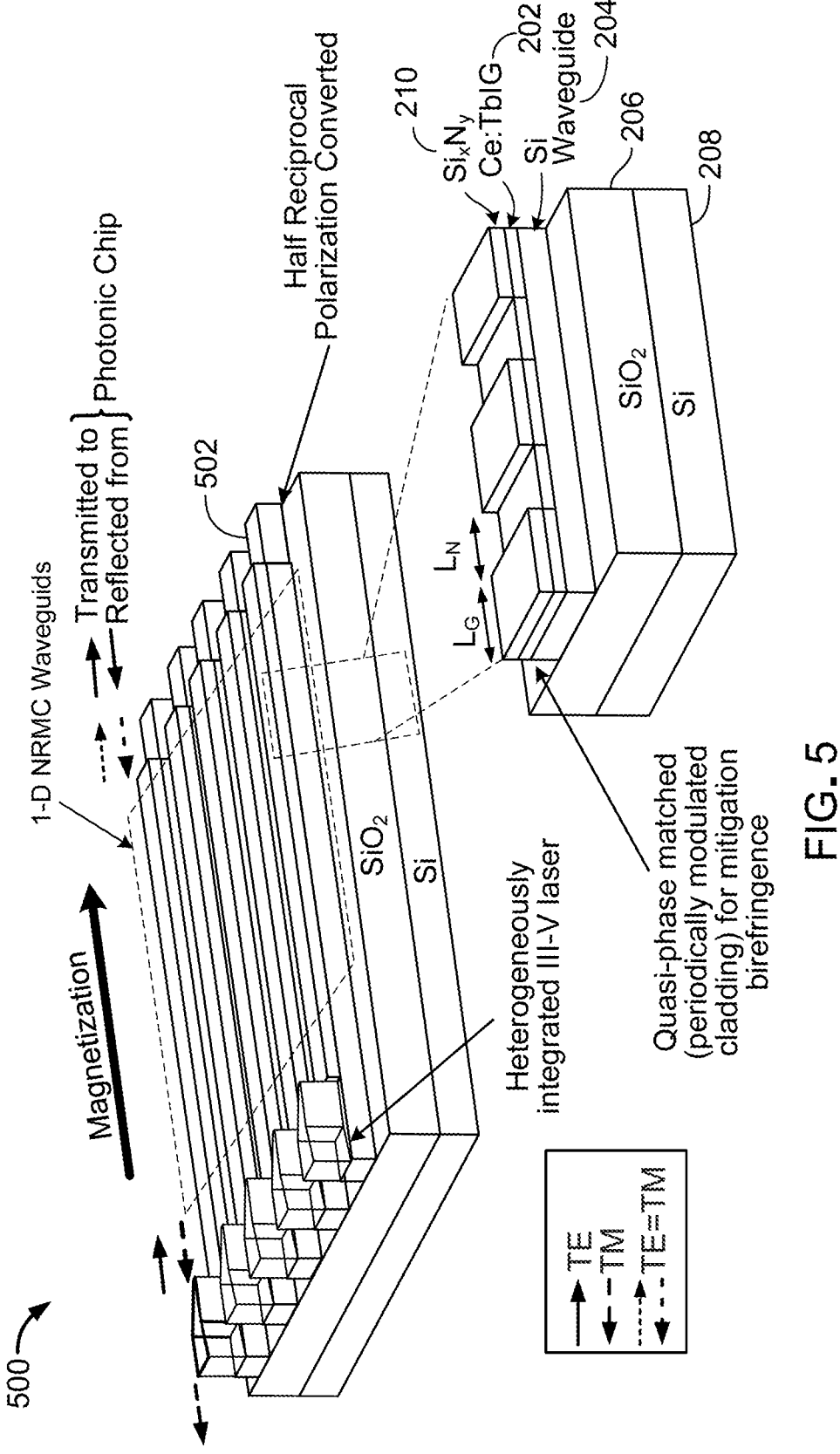

FIG. 5 is a schematic illustration of an exemplary optical isolator design using non-reciprocal mode conversion in which garnet is sputtered as a cladding to the waveguide.

Figure 6:
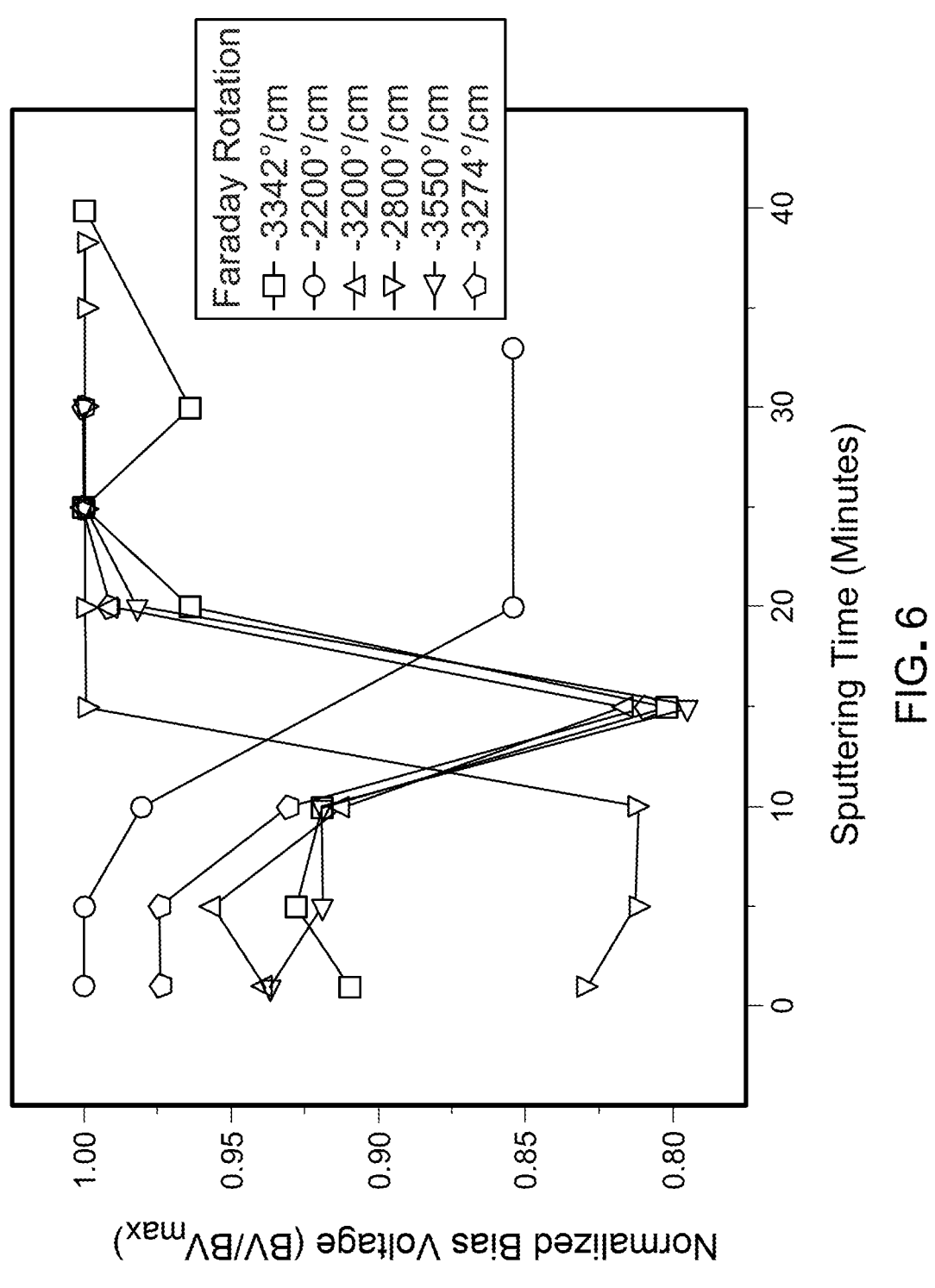

FIG. 6 is a graphical illustration of exemplary fluctuations of bias voltage during a deposition process.

Figure 7:
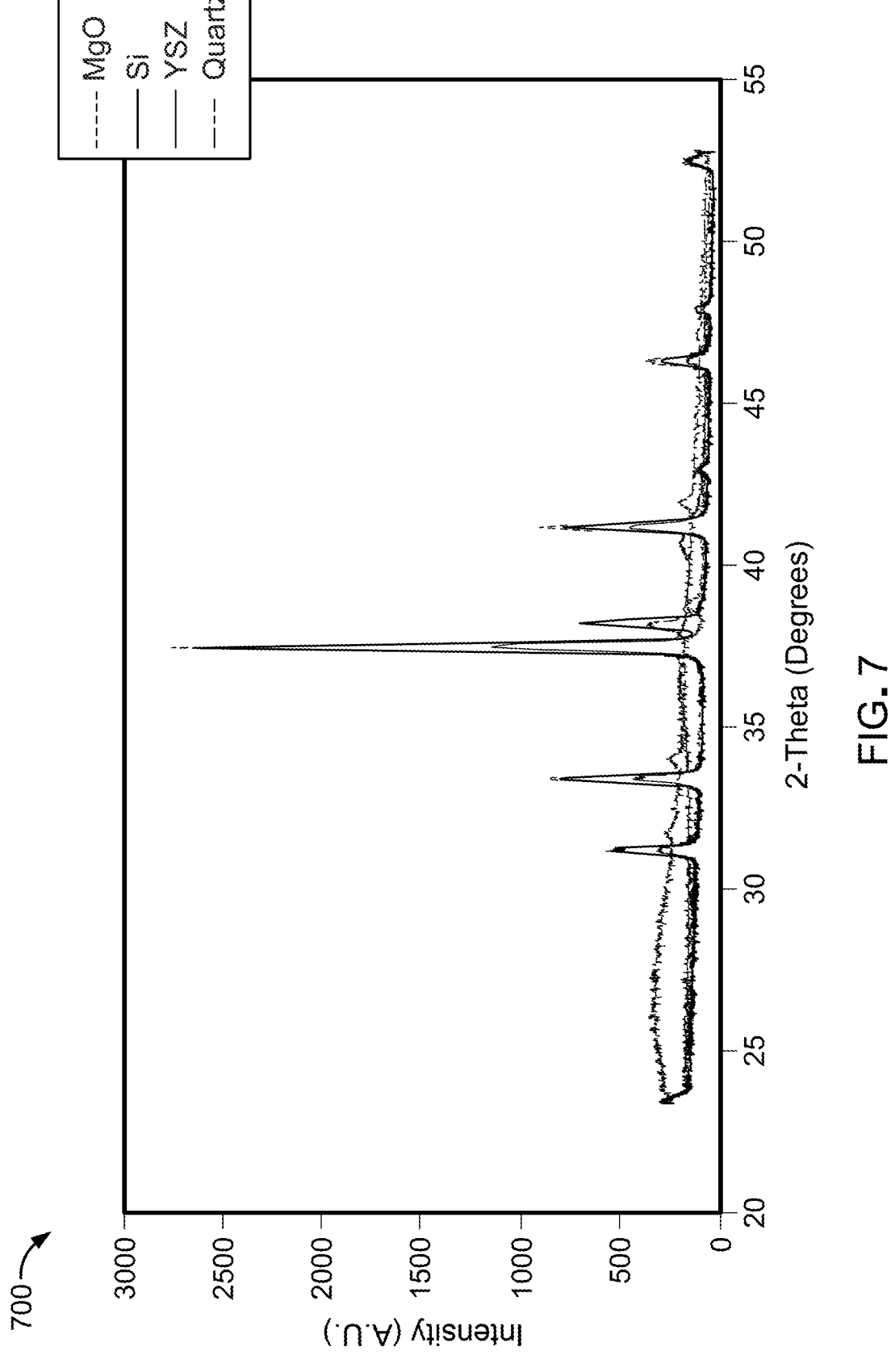

FIG. 7 is a graphical illustration of the x-ray diffraction measurements of a substrate at various sputtering powers.

Figure 8:
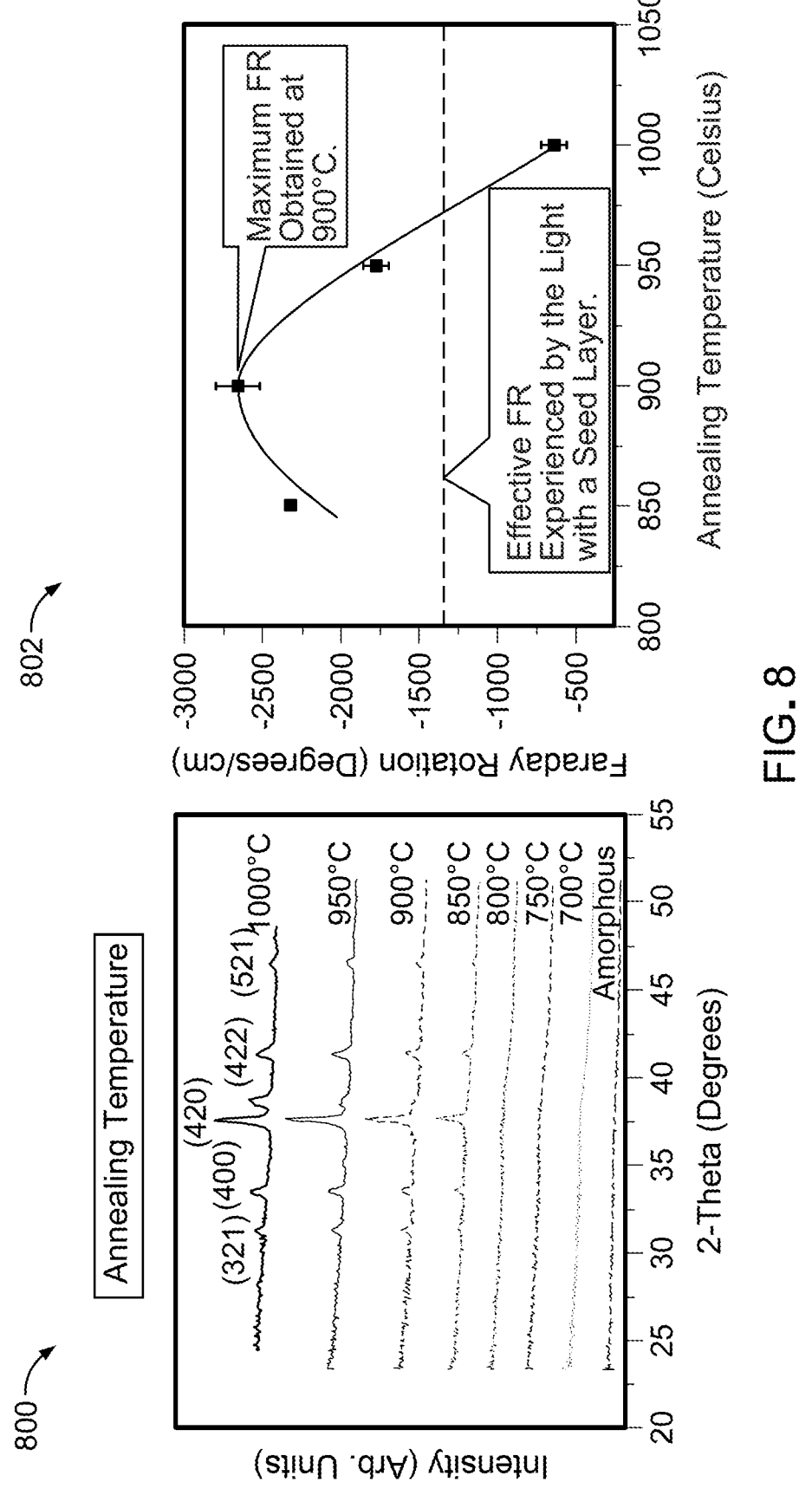

FIG. 8 is a graphical illustration of the effect of annealing temperature on a particular crystallization process.

Figure 9:
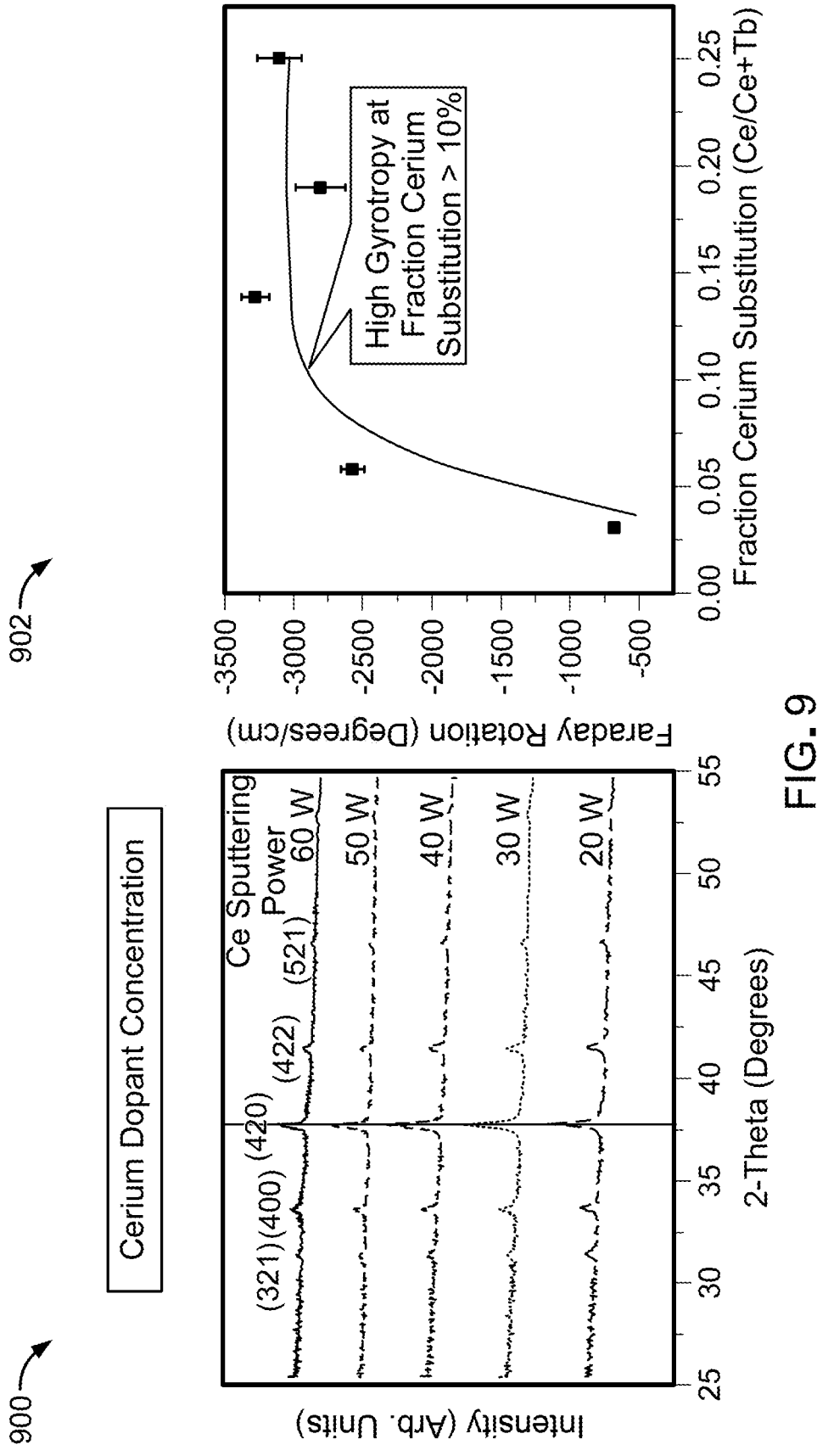

FIG. 9 is a graphical illustration of the effect of dopant concentration on a particular sputtering process.

Figure 10:
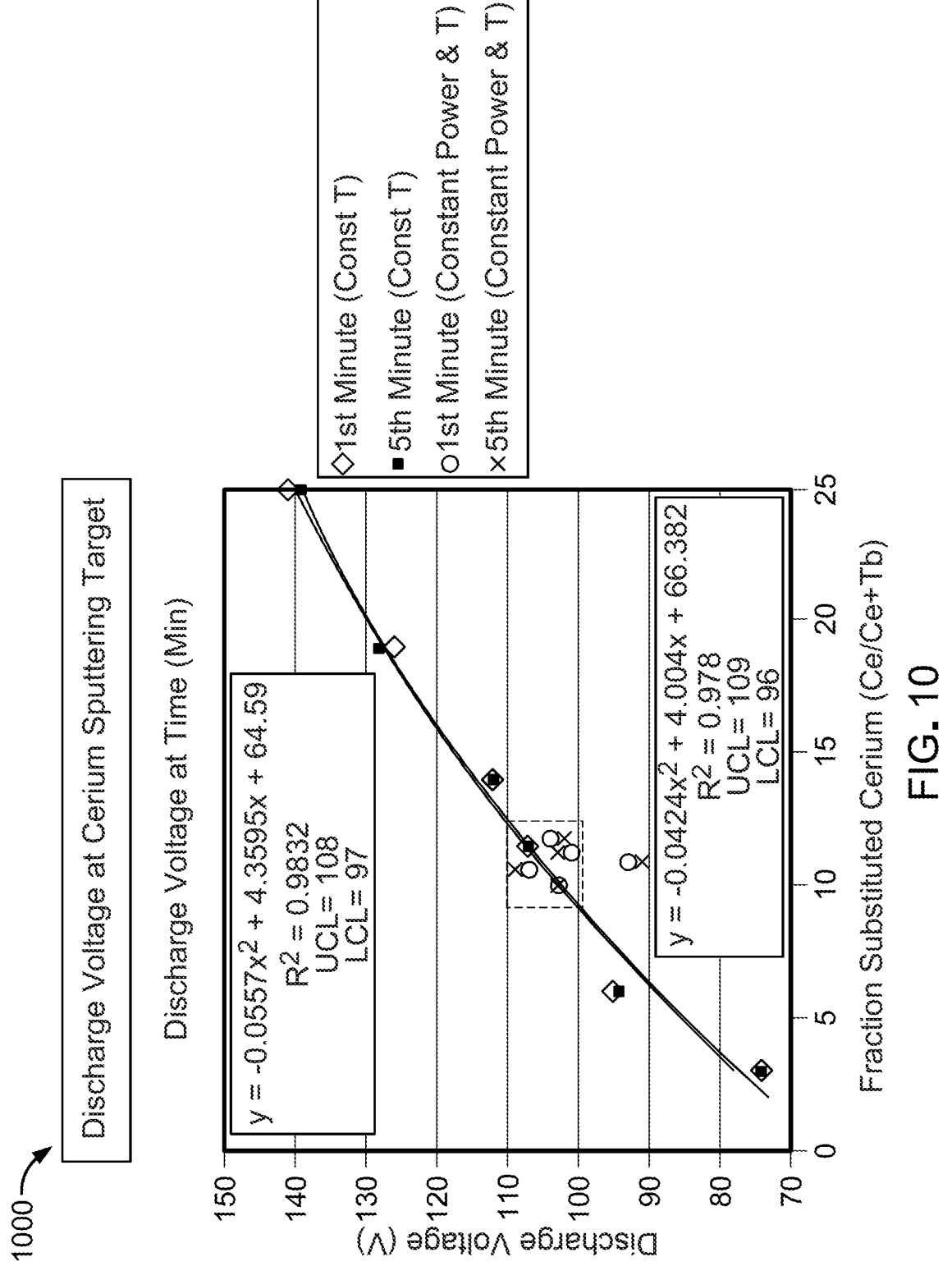

FIG. 10 is a graphical illustration of the effect of discharge voltage, or forward power, for a particular sputtering process.

Figure 11:
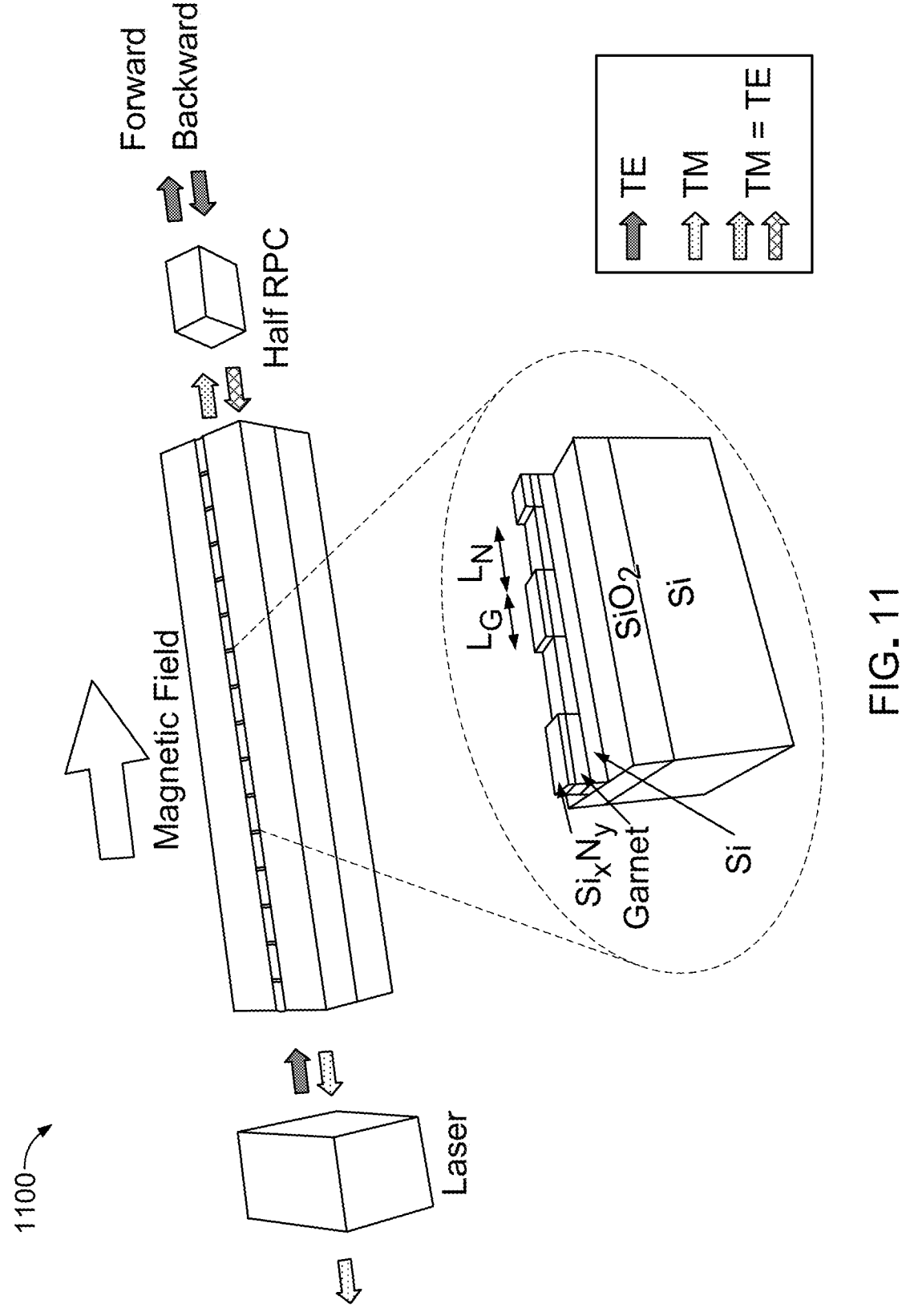

FIG. 11 is an illustration of an exemplary laser integrated with an optical isolator and a half reciprocal polarization converter.

Figure 12:
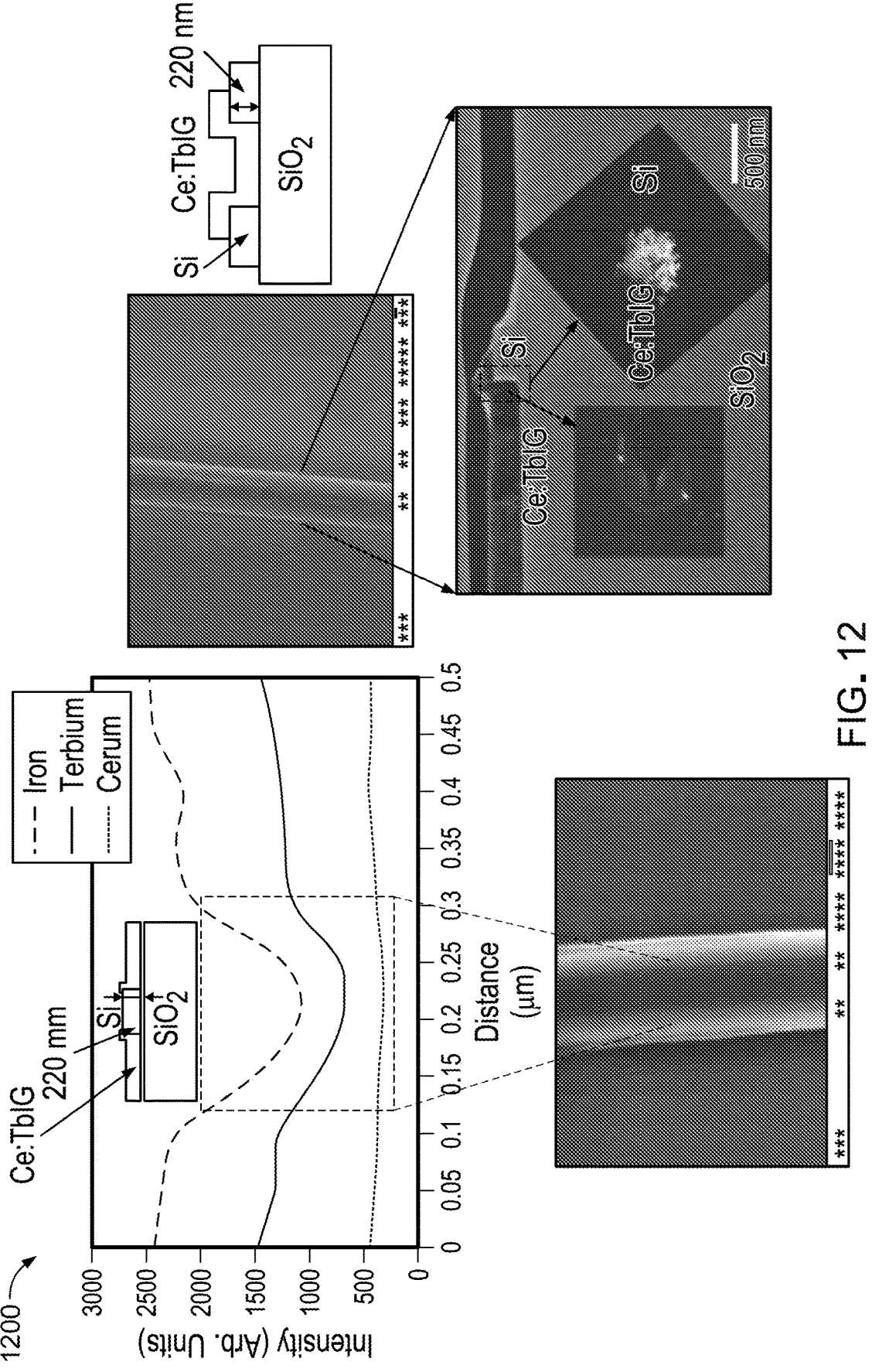

FIG. 12 is an illustration of a Ce:TbIG thin film on the side and the top of a waveguide.

Figure 13:
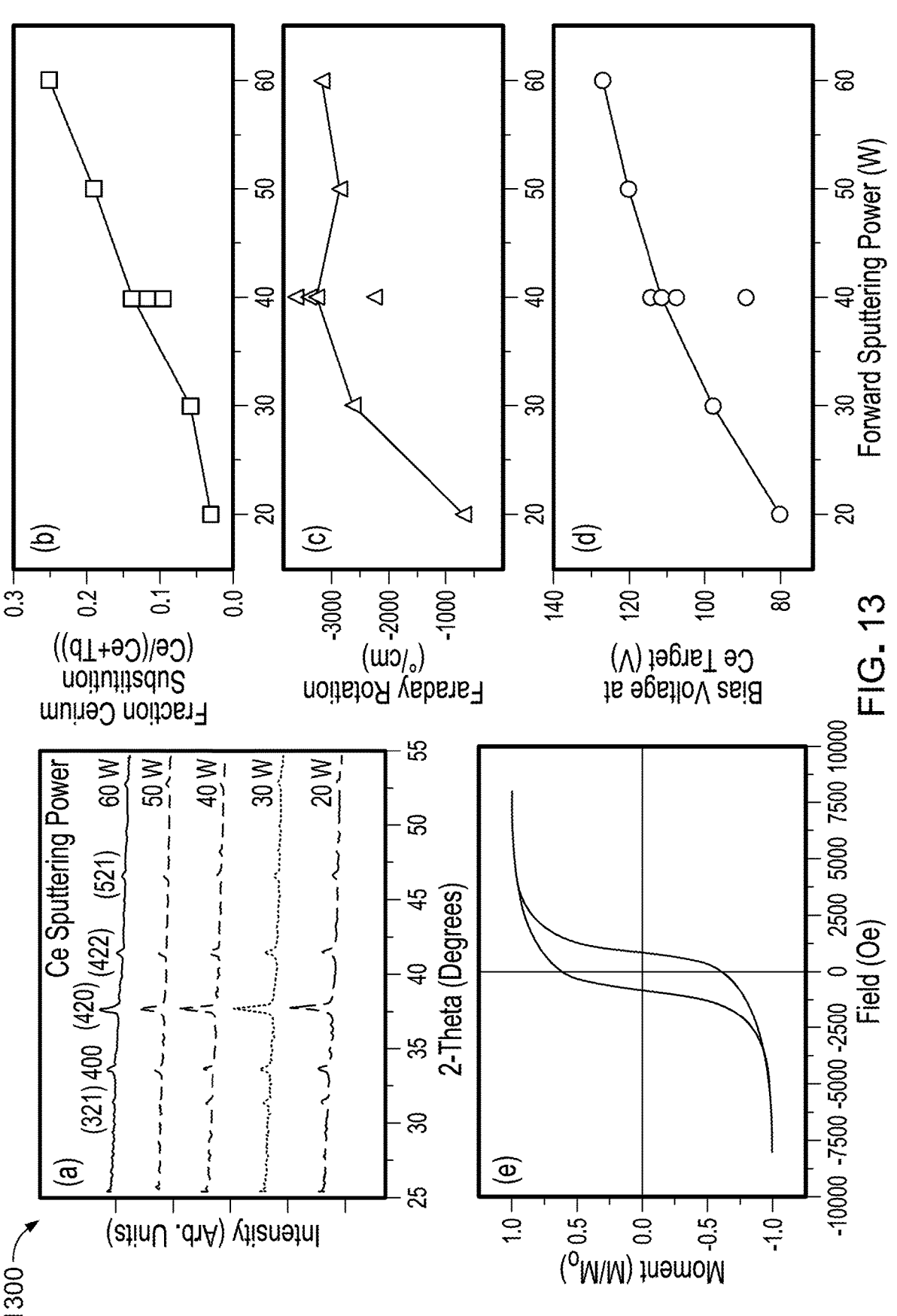

FIG. 13 is a graphical illustration of the optimization of a dopant concentration for a particular dopant, x-ray diffraction measurements of various substrates, and the interaction of forward sputtering power and the fraction of substitution, Faraday rotation, and bias voltage of a particular target material.

Figure 14:
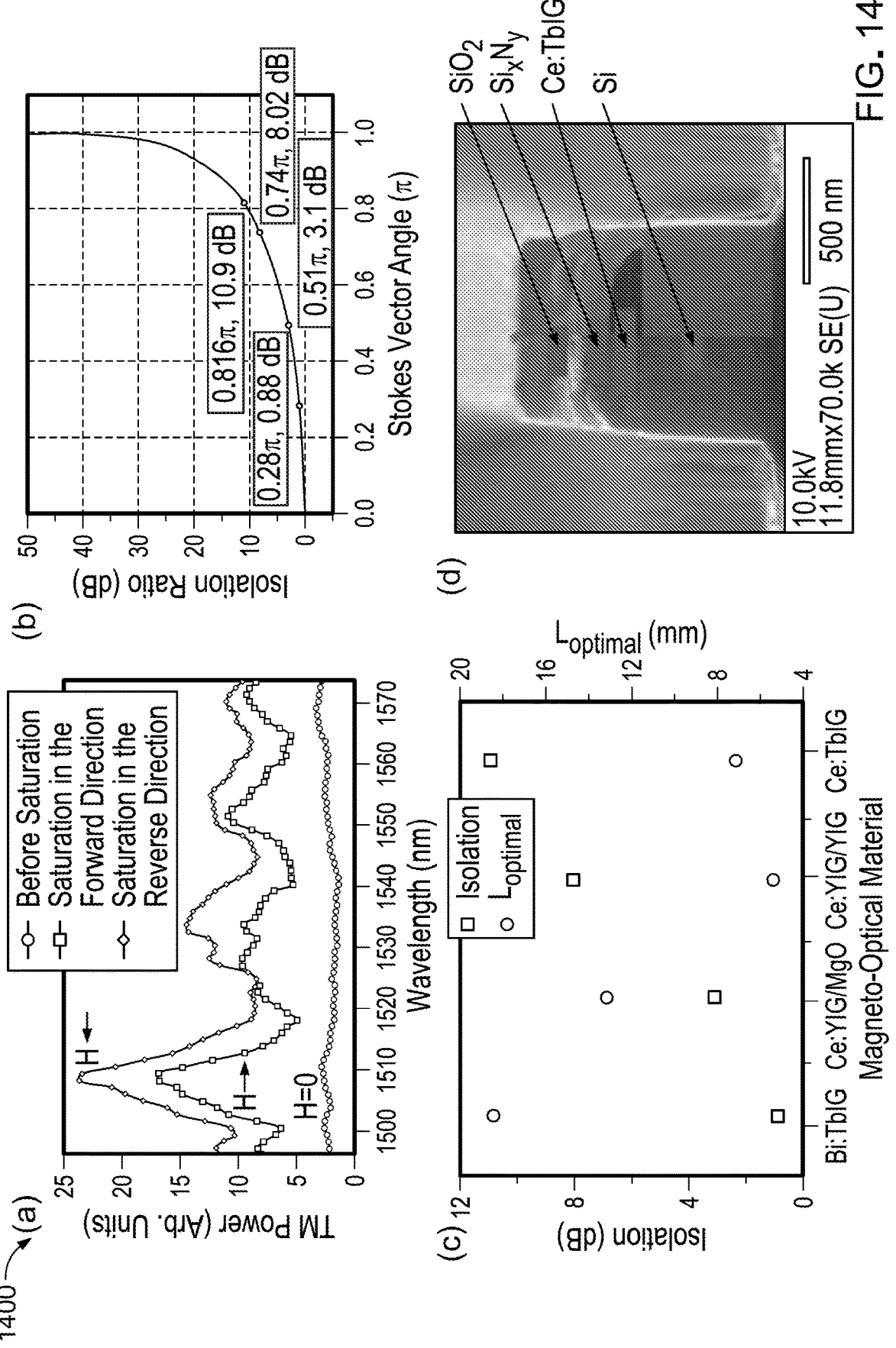

FIG. 14 is an illustration of the relationship between isolation ratio and Stokes vector angle and a cross section-scanning image of a waveguide isolator with a particular optical isolator active layer and an illustration of the TM mode output with TE mode laser source and the relationship between the magnitude of isolation and an optimal length of a device for various magneto-optical cladding materials.

FIG. 15 is a table illustrating exemplary measurements of for different garnet cladding layers.

Figure 16A:
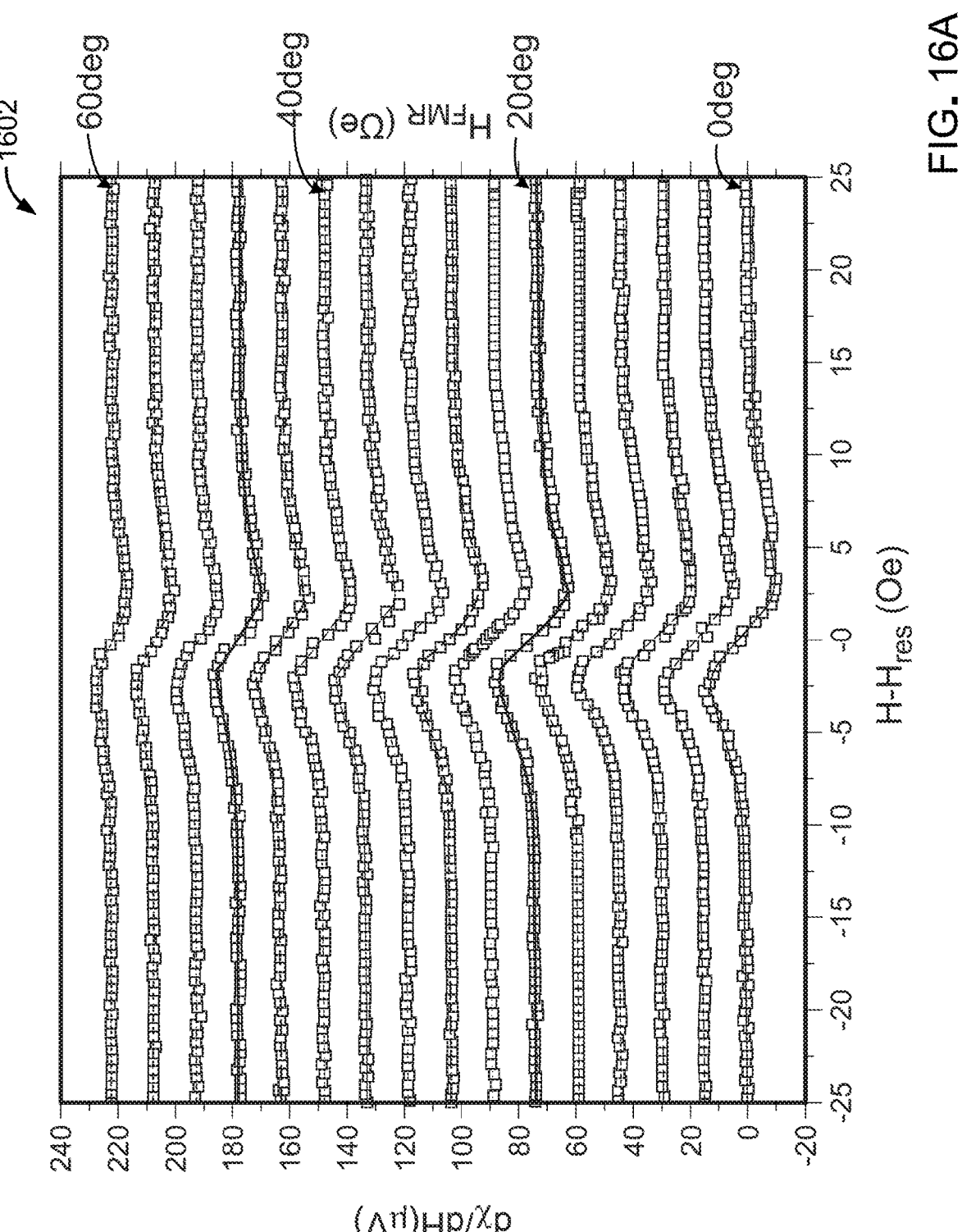
Figure 16B:
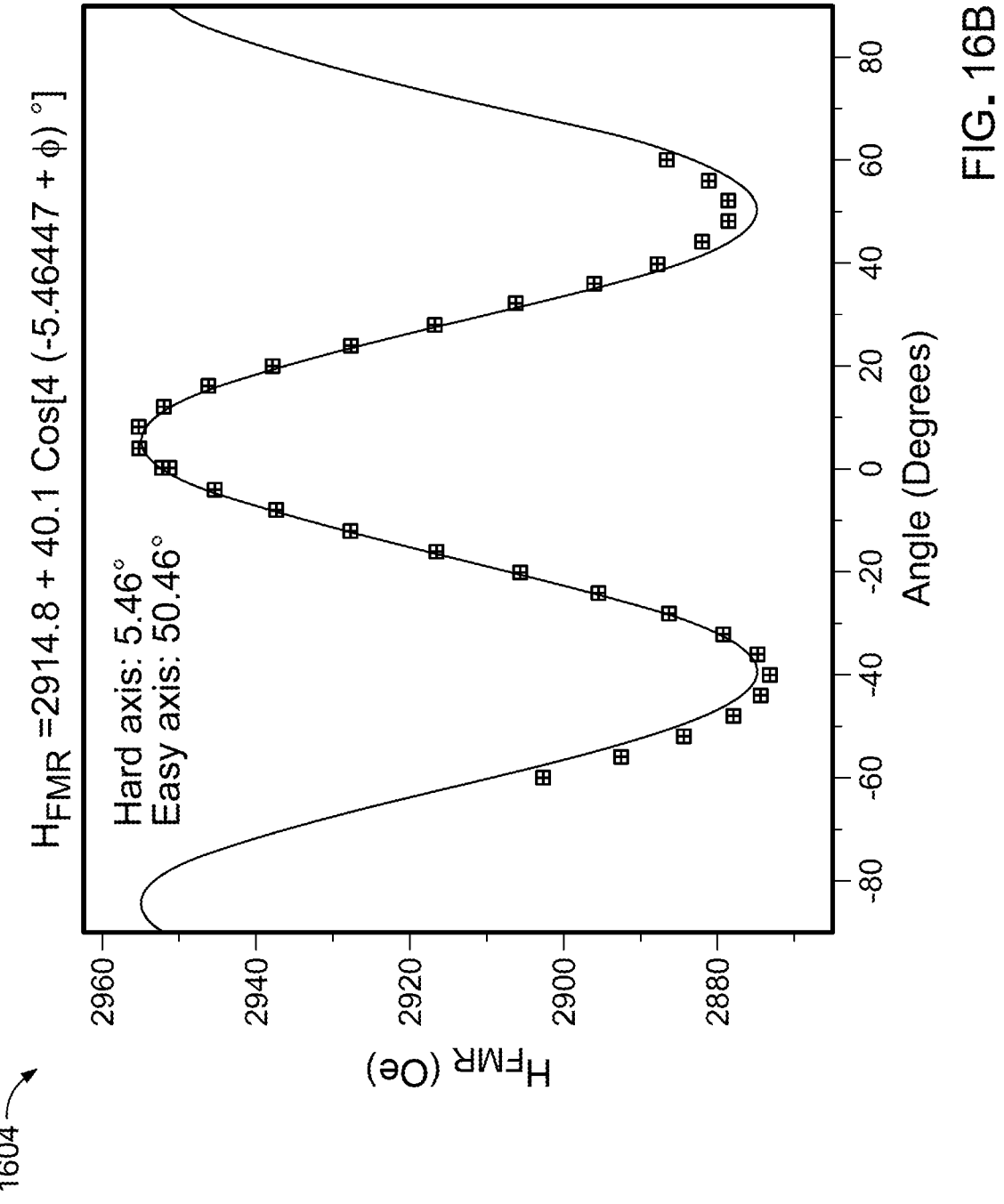
Figure 16C:
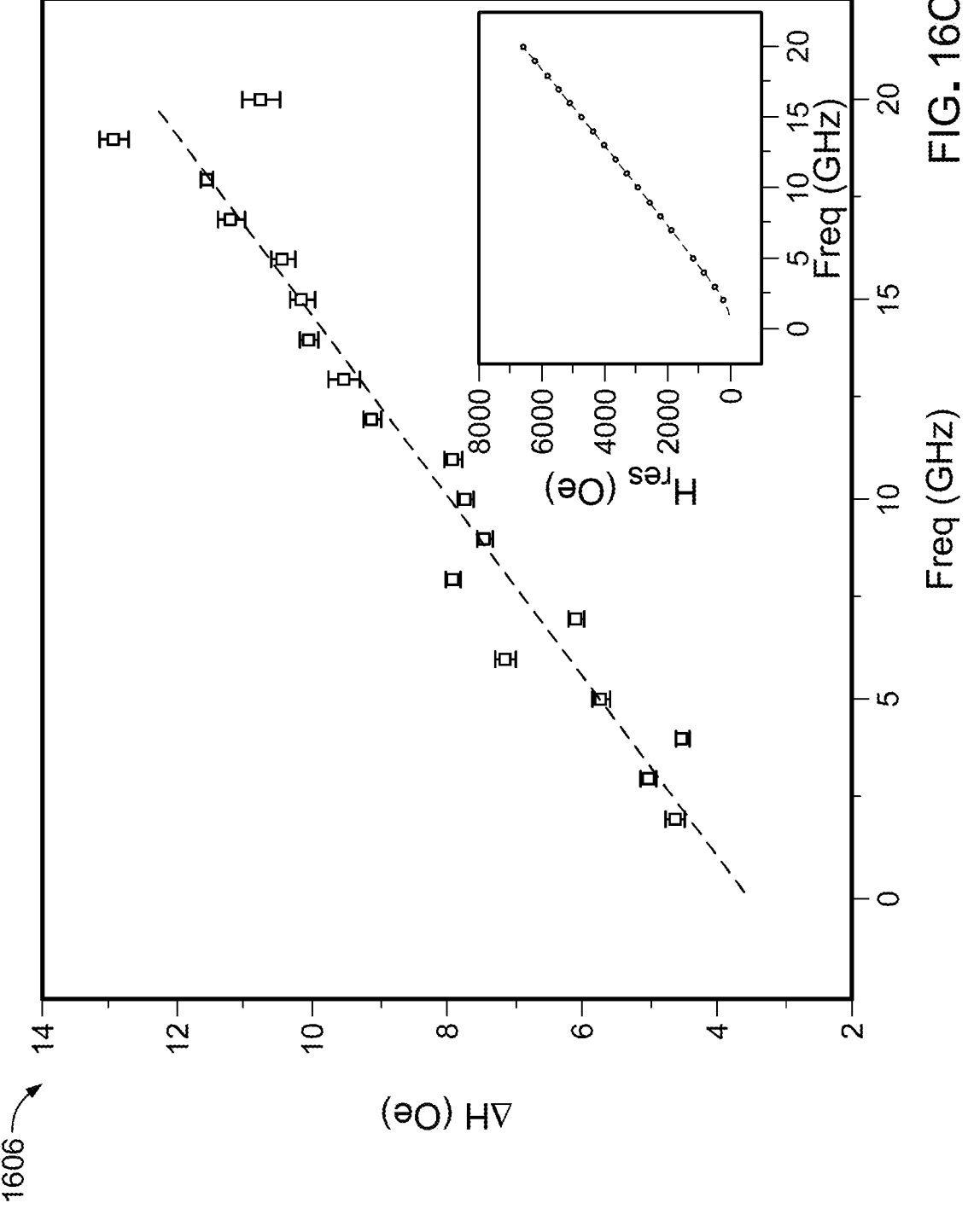

FIGS. 16A-C are graphical illustrations of the results of a sputtering process that demonstrate the linewidth, damping parameter, and symmetry of the magneto-optical material.

Figure 17:
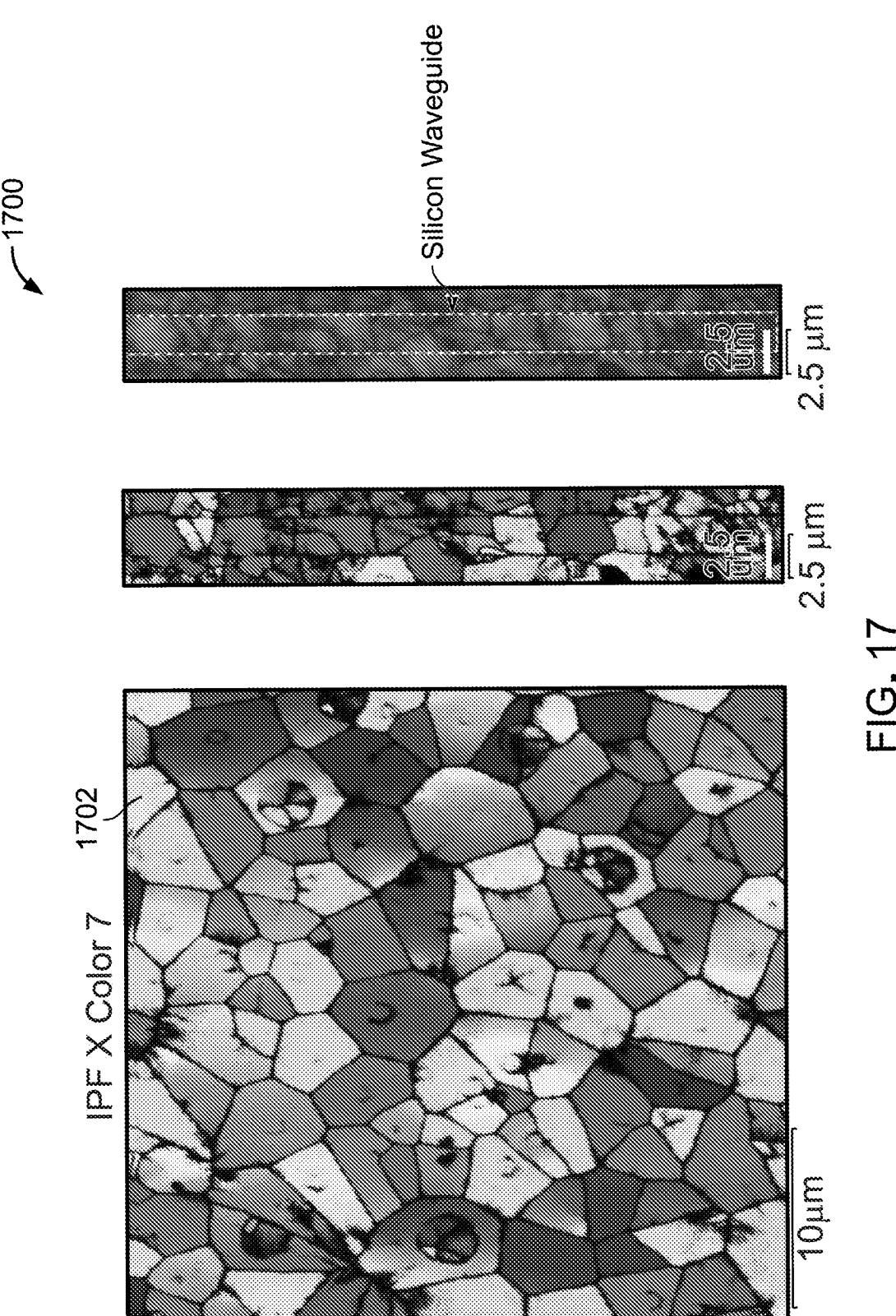

FIG. 17 is an image using an electron backscatter diffraction (EBSD) imaging technique illustrating the improved quality of the material.

DETAILED DESCRIPTION

Isolators are unidirectional passive devices used in photonic integrated circuits to protect the laser from destabilizing back reflection of light. The unidirectional nature of an isolator may be realized by using the magneto-optical property of rare-earth iron garnets. The effectiveness of an isolator largely depends on the Faraday rotation (magnetic gyrotropy), or the extent to which the material can rotate light.

Some applications of gyrotropic devices having a material with a high level of Faraday rotation include quantum computing and optical computing. For example, in both cases, the polarization state of light is a key parameter and gyrotropy is a way to control such polarization. Optical computing chips are typically fabricated on silicon wafers.

If the garnet were on a garnet substrate, integrating it with silicon would be difficult. Sputtering allows the garnet (e.g., Ce:TbIG) to be deposited on silicon, overcoming integration challenges. These applications would benefit from a sputtered garnet, which can be integrated with silicon and therefore other electro-optic devices, instead of needing a garnet on a garnet substrate (garnet substrates are expensive and not used in the fabrication of other electro-optic devices needed for the full application of computing.

Achieving high Faraday rotation is challenging for various reasons. First, integration of a magneto-optic material on a substrate typically benefits from using a substrate formed from a specific material for reasons such as material compatibility and lattice matching. For example, magneto-optic garnets can be grown epitaxially on garnet substrates, such as gadolinium gallium garnet (GGG). Thin layers (e.g., hundreds of nm) of certain types of magneto-optic materials such as yttrium iron garnet (YIG) can be grown on semiconductor substrates such as a silicon substrate. However, limited achievable layer thickness and relatively low Faraday rotation (e.g., around +200°/cm at around 1550 nm for YIG) of such materials limits performance of Faraday rotators based on such magneto-optic materials. Tens of degrees Faraday rotation would require millimeter thicknesses which are essentially bulk thicknesses (e.g., substrates are typically fractions of millimeters thick).

High Faraday rotation may be useful in obtaining large isolation ratios in photonic isolators. Non-reciprocal phase shift (NRPS) based designs can be utilized to obtain large isolation ratios, but such designs are limited to TM-mode operation, while many existing lasers emit TE-mode light. Furthermore, NRPS designs are generally used with around 220 nm Si core thicknesses, making them dimensionally incompatible with integrated lasers which are typically fabricated on around 500 nm Si core.

Certain magneto-optic materials, such as doped garnets, including bismuth-doped YIG (Bi:YIG) and cerium-doped YIG (Ce:YIG), can provide higher Faraday rotation (e.g., around −4500°/cm at around 1550 nm for Ce:YIG grown on GGG).

In some cases, the garnet is deposited in two steps by first depositing a seed layer of undoped garnet, followed by depositing a doped layer of garnet on the seed layer. This improves the garnet material quality and provides better Faraday rotation, but requires additional expensive lithography steps. Additionally, the presence of the seed layer may result in lower Faraday rotation and higher optical losses when formed as cladding on a waveguide layer. Alternatively, garnet can be grown separately on a garnet substrate. However, this is not a foundry friendly solution as these garnets cannot be monolithically integrated.

The present disclosure addresses these issues and is directed to forming an optical isolator active layer directly on a substrate and providing high Faraday rotation (e.g., >3000°/cm). Advantageously, the disclosed device architectures can be achieved using planar processing techniques. While traditional planar integration solutions to generate TE mode isolators required a large footprint, the present disclosure enables compact, integrated form-factors and large-scale manufacturing in an economic manner.

In some implementations, the methods described herein include depositing a doped garnet layer directly on a substrate without the use of a seed layer. For example, the methods may include forming the doped garnet layer as an optical isolator active layer directly on a waveguide. The methods disclosed herein may avoid the additional fabrication costs associated with the seed layer. Furthermore, the doped garnet layer generated from these methods can be used on a Si core (around 500 nm thick) and is compatible with both the mode and dimensions of currently integrated lasers. The present methods use non-reciprocal mode conversion with quasi-phase matching to realize mode-interoperability (TE and TM mode) and dimensional compatibility with currently integrated lasers. The weaker interaction of the propagating mode with the garnet cladding in thicker core Si waveguides can be offset by using a high gyrotropy seed layer-free magneto-optical material.

As explained above, thin-film garnets can replace bulk isolators and enable on-chip laser integration. Garnets (such as Ce:YIG, Bi:YIG) use a thin seed layer in order to grow on non-garnet substrates like Si. This reduces the effective Faraday rotation experienced by light on silicon on insulator (SOI) platforms.

Figures 1A, 1B:
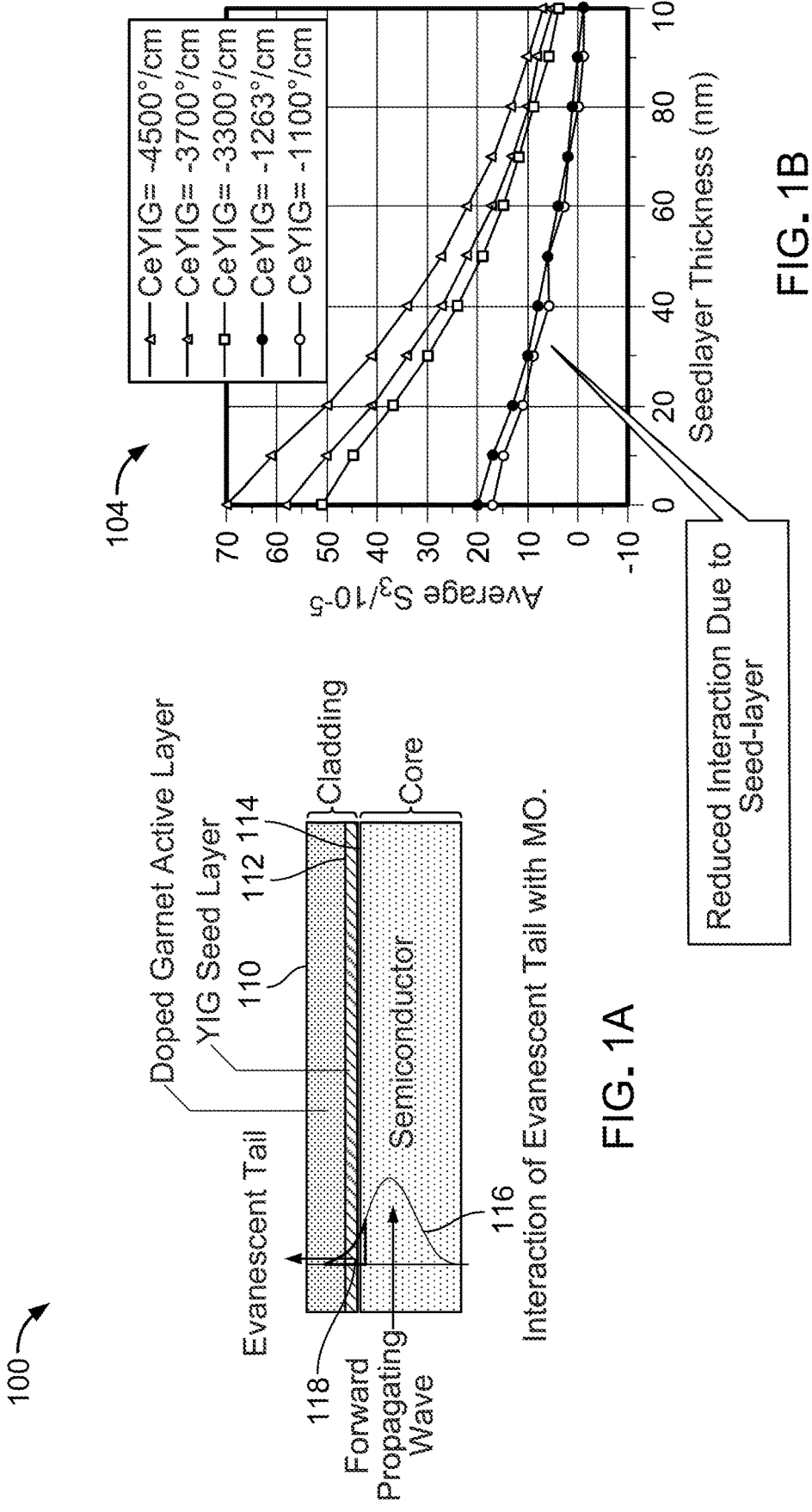
FIG. 1A is a schematic that illustrates an example of an optical isolator active layer formed on a seed layer.
FIG. 1B

FIG. 1A illustrates an optical isolator 100 with cladding including a cerium-doped garnet active layer 110 formed on a YIG seed layer 112 (Ce:YIG), where the cladding is located on a semiconductor substrate 114. A representation of a forward propagating wave 116 and an evanescent tail 118 of the forward propagating wave 116 is also shown. A thickness of the seed layer 114 is directly related to the polarization state of the optical isolator 100, which is represented by the Stokes parameter $S_3$. Seed layers 112 can be between about 20 nm and about 100 nm. In some implementations, a seed layer of around 45 nm can provide close to 99% crystallinity for subsequently doped garnet. For example, a seed layer of around 45 nm can provide greater than 95% crystallinity for subsequently doped garnet.

FIG. 1B is a data plot 104 with the seedlayer thickness (nm) along the horizontal axis and the average Stokes parameter $S_3$ along the vertical axis. FIG. 1B is a simulation 104 of the net Faraday rotation experienced by the light if a garnet (Ce:YIG) were deposited on a seed layer of a specific thickness (nm) (shown along the horizontal axis). As the seed layer thickness increases, the net Faraday Effect, represented by the Stokes parameter S3, also reduces. The representative Faraday rotation data lines correspond to different Faraday rotations for Ce:YIG reported in the literature. A common attribute is the sharp decline in S3 with thicker seed layers. The representative Faraday rotation data lines are an indication of the quality of the magneto-optical material. Faraday rotations for the highest reported quality Ce:YIG 9(4500 degrees/cm which can only be achieved on GGG substrates) to the lowest reported value for Ce:YIG (−1100 degrees/cm) are shown. Data plot 104 indicates that decreasing the seed layer thickness decreases the Stokes parameter $S_3$. The interaction of the Faraday rotation (represented in degrees/cm) and Stokes vector (component $S_3$) of a material can be seen the data plot 104. In particular, the interaction of the Faraday rotation and Stokes vector is reduced due to the seed layer 112 thickness.

The presently described techniques include exemplary methods for fabricating magneto-optic material that involves monitoring of the bias voltage at a sputtering target of a dopant element to control the quality of the magneto-optic material (such as the cerium-doped garnet active layer 110 shown in FIG. 1). In these techniques, the bias voltage at the target is monitored as a function of time during a radio-frequency (RF) reactive co-sputtering process. The fluctuation of the bias voltage with time is dependent on several factors such as gas flow into the sputtering chamber, forward sputtering power, and the nature of the target material.

For certain dopants, such as cerium, this fluctuation follows a characteristic trend which corresponds to the oxidation and deoxidation of the surface of the target, commonly known as the transition from a metallic to nonmetallic back to metallic nature at the surface. Rather than using the forward sputtering power or post-deposition elemental composition analysis as the primary variable to monitor to differentiate between high and low Faraday rotation samples, the described processes uses bias voltage as the primary indicator. This in situ technique provides the highest repeatability for high quality films because bias voltage is the best indicator of the target surface condition, and it can be monitored and controlled during the film growth. These methods facilitate monolithic integration of photonic isolators because the cladding layer can be formed directly on the waveguide layer of the substrate.

FIG. 2 is a schematic example of an optical isolator 200, which is substantially similar to the optical isolator 100. The optical isolator 200 includes substrate layers 204, 206, and 208, optical isolator active layer 202, and an additional layer 210 on top of active layer 202. Other exemplary devices that use the optical isolators fabricated according to the techniques disclosed herein can include, for example, Fabry-Perot rotators and integrated quantum and spintronic devices.

Active layer 202 is a layer of magneto-optic material that exhibits a magneto-optic effect (e.g., non-zero Verdet constant). Active layer 202 is capable of providing Faraday rotation when a magnetic field in applied parallel to the propagation of the light, e.g., light traveling through the waveguide layer 104. Maximum Faraday rotation for a given magneto-optic material type and thickness can be obtained by applying a magnetic field having a field strength sufficient to magnetically saturate the magneto-optic material. Examples of magneto-optic materials include yttrium iron garnet (YIG), bismuth-doped YIG (Bi:YIG), cerium-doped YIG (Ce:YIG), terbium iron garnet (TbIG or TIG), bismuth-doped TbIG (Bi:TbIG or Bi:TIG), and cerium-doped TbIG (Ce:TbIG or Ce:TIG). The active layer 202 may have a Faraday rotation greater than at least −3000°/cm for a predetermined wavelength of light. For example, the Faraday rotation of active layer 202 may be greater than at least around −3500°/cm, greater than at least around −4000°/cm, greater than at least around −4500°/cm, or greater than at least around −5000°/cm for near infrared wavelengths of light. The rotations will be greater at shorter wavelengths (e.g., visible light).

Layer 204 can be formed from a semiconducting material, such as silicon, or visibly transparent materials, such as oxides and nitrides. Layer 204 can be a waveguide layer for light to propagate inside its structure. In an exemplary embodiment, substrate layers 206 and 208 and waveguide layer 204 together form a silicon on insulator (SOI) substrate, where layer 206 is silicon dioxide, and layer 208 is silicon. SOI technology uses a layered silicon, insulator, silicon substrate in place of a silicon substrate to reduce parasitic device capacitance in electronics. Therefore, SOI is readily available and enables electronic integration with the gyrotropic materials described in this specification. Layer 206 can be formed from various insulator materials other than silicon dioxide, including sapphire. In some implementations, substrate layers 206 and 208 can be an area for light to propagate perpendicular through or reflect off.

The additional layer 210 can be formed from various materials, including silicon nitride, to provide an index-matched cladding for implementations having half-beat lengths (i.e., where active layer 202 is not used as cladding for phase-matching purposes). In an exemplary example, this additional layer can be a garnet of opposite chirality to the active layer to provide double activation.

The optical isolator 200 can be fabricated using a method that deposits a layer of magneto-optical material, such as a doped magneto-optical material, directly onto the substrate and annealing to provide a highly crystalline active layer having a high Faraday rotation without the need for a seed layer to be deposited first. The magneto-optical material can include a garnet material including, e.g., an iron garnet material, and more specifically including, e.g., doped iron garnet materials such as bismuth-doped yttrium iron garnet (YIG) (Bi:YIG), cerium-doped YIG (Ce:YIG), bismuth-doped TbIG (Bi:TbIG or Bi:TIG), and cerium-doped TbIG (Ce:TbIG or Ce:TIG).

An exemplary fabrication method can include the following steps. First, a substrate (e.g., layers 206, 208) such as silicon is provided. For example, a single-crystalline silicon substrate that has been polished on a single side or on both sides can be used. In some cases, the substrate can include multiple layers. For example, the substrate can be a SOI substrate that includes an Si layer and an SiO$_2$ layer. The substrate can be composed of materials such as silicon nitride, silicon oxide, cubic zirconia, among others. In cases where diffusion between the garnet and the substrate material can occur, an intermediate layer can be used that is a material such as silicon nitride, silicon oxide, cubic zirconia, among others.

In some cases, the substrate includes a waveguide layer 204. For example, the substrate can include a waveguide layer formed from Si. In some cases, the garnet itself is the waveguide. For example, a glass substrate can be used with a garnet waveguide. This application allows light to be confined within the thickness of the garnet. By designing the optical isolator 200 with different waveguide configurations, light is guided either through a garnet waveguide or through another waveguide with garnet on top.

Next, a magneto-optic material as an active layer 202 is formed directly on the substrate. In some cases, the active layer 202 serves as a cladding to an underlying waveguide formed in the substrate. The active layer 202 can be formed using, for example, a radio frequency (RF) sputtering technique in an oxygenated environment. Use of a radio frequency sputtering technique 300 may provide films having uniformity and low surface roughness.

FIG. 3 illustrates a radio frequency sputtering technique 300 for forming the firms or layers on a substrate 320. One or more substrates 320 are placed on a platform 304 within a vacuum chamber 302. Three sputtering guns 306 allow argon from a magnetron to flow in 308 and impact a target 310 releasing target atoms 312 that are sprayed onto the substrates 320. The argon ions near the magnetron strike the target initiating a release of atoms from the target. Continued flow of argon sustains this process. Oxygen combines with the released atoms to form an oxide on the substrate (e.g., Silicon wafers). A vacuum pump 314 extracts air and other gases from the vacuum chamber 302. An inlet argon at the targets is used for sputtering the targets and an inlet of oxygen (O$_2$) at the substrate 316 is used for oxidization of the film as it is deposited. Cladding layer 202 can be formed in a sputtering environment using the radio frequency sputtering technique 300.

While three sputtering guns 306 are shown with the radio frequency sputtering technique 300 in FIG. 3, a different number of sputtering guns can be used, such as 1, 2, 4, or 5 sputtering guns. When three sputtering guns are used, each sputtering gun may include a metallic target. For example, the first gun may include the cerium target, the second gun may include the terbium target, and the third gun may include the iron target. When one or two sputtering guns are used, at least one target is an alloy or a compound. For example, if one sputtering gun is used, an alloy of cerium, terbium, and iron may be used as the target of the sputtering gun. If two sputtering guns are used, an alloy of terbium and iron may be used as a target of one sputtering gun and cerium is used as the target of the second sputtering gun, where the sputtering gun for the cerium target is controlled according to the techniques disclosed in this specification. Metallic targets have a higher sputter yield (or deposition rate measured in angstroms/second) compared to alloy or compound. Hence, using three sputtering guns is usually preferable since it the process is faster than using one or two sputtering guns. While the bias voltage should be monitored for all targets, the first sputtering gun with the cerium target is most important for Ce-doped iron garnets because it most impacts the value of the gyrotropy achieved in the deposited film. Therefore, this bias voltage control will be discussed in detail below.

For a particular, specified composition of the active layer 202, the method includes determining at least one sputtering process parameter. For example, the process parameter can include a forward sputtering power, or the forward power (W) applied when sputtering a particular material. Other processing parameters include bias voltage, reflected power, pressure, oxygen partial pressure, temperature, and sample movement, such as rotation.

The method then includes sputtering of multiple targets according to the determined parameter to deposit the cladding layer 202 on the waveguide layer of the substrate. For example, the targets can include cerium, terbium, or other rare earth materials, with iron to make iron garnet films. Each target is excited by a sputtering beam having a specific forward sputtering power.

The method includes measuring an initial bias voltage value at a particular sputtering target (e.g., cerium) and, throughout deposition of the active layer 202, maintaining the bias voltage at the initial value within a predetermined threshold relative to the initial value. For example, the bias voltage can be maintained within a particular percentage of the initial value. The initial value of the bias voltage at a target can be machine dependent, and can be calibrated at the beginning of each deposition process. The bias voltage provides information regarding the condition of the surface of the target. Because the sputtering is performed in an oxygenated environment and because the target can be a metal, if the surface of the target becomes oxidized, the bias voltage can drop by a measurable amount. The deposition rate also depends on the bias voltage. As described in further detail below, certain targets have drops in bias voltage that are more distinctive and easier to measure.

Bias voltage is a characteristic of a metallic sputter target that is related to the ion induced secondary electron emission. In a sputtering system, the target is held at a negative bias (cathode) to attract the ionized sputtering gas (argon ions) that are positively charged. This results in the bombardment of cathode by argon ions which dislodges target material from the cathode and triggers secondary electron emissions. The surface of the target (oxidized or purely metallic) dictates the ion induced secondary electron emission coefficient, which changes the bias voltage depending on the condition of the target. This is the primary basis for defining the bias voltage which is sometimes referred to as the discharge voltage. The bias voltage is monitored through the readout display in the target power supply. This can be done manually. This can also be automated in the instrument software in an external computer that controls the tool.

If the bias voltage reduces below a pre-determined level for a specific sputter target, it may indicate an onset of oxidation of target surface. Cutting off the flow of reactive gas (oxygen) and/or closing of the target shutter are some of the corrective measures that can be taken to bring the bias voltage to levels typical of metallic target surfaces. Then, the shutter is opened and/or the oxygen flow is restored.

Maintaining the bias voltage can include increasing the forward power of a sputtering gun or closing a shutter of a sputtering gun to allow ions to continue to bombard the particular target and clean the surface if it is oxidized. In some implementations, forward power is increased until a drop in bias voltage is sustained fora threshold period of time or the drop in bias voltage is too large. In such situations, the surface of the target may be too oxidized for deposition, and the ions in the ambient, gaseous environment are allowed to bombard the target until the surface of the target is cleaned. Additionally, the forward power of a particular sputtering gun must be sufficient such that the rate of sputtering of atoms off of the target is faster than the rate at which the target is oxidizing.

Maintaining the bias voltage when multiple targets are used can be difficult. In some implementations, the bias voltage decreases and the resulting film will have low gyrotropy or not contain the atomic composition to form the desired phase (e.g., garnet). In some cases, this is only evaluated after the process is complete. However, real-time monitoring of the state of the process using the bias voltage improves the process and allows corrective action to be taken during each deposition which ensures each deposition produces reliably high gryrotropy in the films.

A single or multiple targets can be used. For example, a single target with an alloy of cerium, terbium, and iron can be used. However, when using a single target, one needs monitor the bias voltage in case the target oxidizes when depositing the cerium. In some cases, the cerium may stay in the target, while the terbium and iron may go into the film. For example, if the single target is an alloy of cerium, terbium and iron, the sputter yield (i.e., the number of atoms ejected out of the target for one argon ion striking it) will be element dependent. Heavier elements like cerium and terbium might require 4 argon ions to dislodge one atom of the metal from the target and iron might only require 2 argon ions. Considering this variability, when the target oxidizes, the sputtering yield might selectively be lower for cerium, while unaffected for terbium or iron.

The active layer 202 may then be annealed to crystalize the layer to form a garnet phase. In some cases, this annealed active layer serves as an optical isolator active layer. For example, the cladding layer can be a cerium-doped terbium iron garnet layer. The annealing can be performed using, for example, the RTA technique. The duration, temperature profile, and gaseous ambient can be set to achieve improved garnet-crystallization of the cladding layer. For example, the duration can range from around 1 minute to around 5 minutes, and the annealing temperature can range from around 850° C. to around 970° C., and particularly between around 920° C. to around 970° C. The gaseous ambient composition, for example, can be an oxygen, nitrogen, argon, or vacuum environment. At this point, the active layer is crystallized into a predominantly garnet phase, which provides a high level of Faraday rotation. For example, a cerium-doped terbium iron garnet active layer 202 can provide a Faraday rotation of about −3000°/cm.

In some cases, two annealing steps are applied. For example, a first annealing of the magneto-optic material deposited according to the techniques disclosed herein may be performed at a first temperature, e.g., between 920-970° C. A second annealing step of the magneto-optic material then may be performed at a second lower temperature between, e.g., 850-920° C. Other multi-annealing processes (e.g., that involve annealing at three, four, or five different temperature ranges) are also possible. In some cases, the rate at which the temperature is increased (ramp-up rate) is between 45-60° C./sec, but other rates can be used. For example, 10° C./sec can be used. The specific rate depends on the process and materials used. In some cases, the rate at which the temperature is decreased (ramp-down rate) is between 10-15° C./sec, but other rates can be used. For example, −10° C./sec can be used. The specific rate depends on the process and materials used. In some cases, annealing happens in an environment of oxygen, nitrogen, and argon, but other constituents can be used. In some cases, the oxygen flow is 10 sccm (standard cubic centimeter per minute), but other flow rates can be used.

While Ce:TbIG is provided as an example of the optical isolator active layer, other materials can be used. Examples of alternative materials for the optical isolator active layer include Bi:YIG (about −1700°/cm), TIG (about 500°/cm) and Bi:TIG (about −500°/cm). For each of these alternative materials, there is a characteristic decrease in bias voltage when the target gets oxidized, which is measured and monitored. The particular sputtering gun used for measuring and monitoring is based on the material. This can influence the bias voltage measurements, but the process is otherwise substantially similar.

EXAMPLES

The following includes example experimental results of optical isolator active layers formed using the fabrication techniques disclosed herein.

Use Cases

There are advantages to forming the magneto-optic material, including doped garnet, using the techniques described herein. SOI PICs are currently manufactured with several hundred devices each, similar to early electronic ICs. However, these SOI PICs still suffer from a lack of deployed solutions for incorporating isolators (or optical "diodes") to protect integrated laser sources. Prototype integrated isolators have dimensional mismatches and mode incompatibility with on-chip laser sources. Dimensional mismatch can, in principle, be accommodated with tapers, and mode (or polarization) incompatibility can be overcome by complex infrastructures, such as polarization converters and couplers, but generally each component and interface can cause unwanted reflections before isolation.

To date, many waveguide isolators have exploited the transverse magneto-optic effect in interferometers or resonators using around 220 nm SOI with magneto-optic garnet top claddings. A NRPS occurs, but only for transverse magnetic- (TM-) polarized guided light, and asymmetric interaction of evanescent waves in the garnet (upper) and silica (lower) claddings is fundamentally required. Consequently, extremely high confinement is essential, and NRPS falls off rapidly core thickness increases beyond around 220 nm. Thin waveguides can also be designed for fundamental (single) mode operation (TE and/or TM) so many components in the rest of the PIC chip typically use around 220 nm SOI. Unfortunately, this means that tapers will be needed between integrated lasers, which are currently around 500 nm thick, and the isolators, leading to detrimental reflections that occur before they can be isolated from impinging back on the laser.

FIGS. 4A and 4B are schematics 400, 450 of on-chip SOI substrate with a laser source. The substrate includes a Si layer 410 and a SiO$_2$ layer 412. The laser is integrated with Si core devices (around 220 nm thick) via a horizontal adiabatic taper coupler. A 500 nm integrated TE-mode laser 402 is used as the light source. A 1D NRMC isolator 404 including a taper 406 provides isolation of all the reflections that can impinge on the laser 402. The location of the 1D NRMC isolator 404 is responsible for this. A two-dimensional interferometer or ring resonator based NRPS isolator 408 is placed after tapering down to around 220 nm in thickness. Use cases for the proposed techniques include implementing an alternative to NRPS for integrated waveguide isolators, such as a non-reciprocal mode conversion (NRMC), which is the waveguide equivalent of Faraday rotation, and which is used in conventional bench-top and fiber-coupled isolators. With the addition of a half reciprocal polarization converter (H-RPC), isolation of TM and/or TE modes is achieved with a simple longitudinal magnetic field. In contrast, isolation of TE modes by NRPS has only been achieved with full polarization converters (RPC). In addition, unlike NRPS devices which are two dimensional (2D) devices, requiring the interferometer and ring resonator to utilize the phase shift, NRMC devices are one dimensional (1D) with very small footprints as shown in FIG. 5.

FIG. 5 is a schematic of 1D waveguide isolator 500 with segmented cladding of Ce:TbIG/Si$_X$N$_Y$ to obtain non-reciprocal mode conversion (NRMC), which is the waveguide equivalent of Faraday rotation. An array of half reciprocal phase converters 502 converts the TE-TM mode output into TE modes for forward propagation into the photonic circuit and vice-versa for backward propagation.

Although larger core dimensions may be formally multi-moded, the higher optical losses for higher-order modes normally prevents them having a significant role in high index contrast waveguides (e.g. SOI for core dimensions <1 μm) other than at splitters/couplers. While the evanescent interaction in a garnet cladding reduces for the fundamental mode for NRMC as the core dimension increases, it falls off comparatively slowly compared to the critical asymmetric criterion in NRPS. Therefore, it is feasible that a combination of the best gyrotropy garnet and proper SOI isolator design can overcome this limitation.

The present methods provide repeatable and foundry-friendly procedures to grow seed layer-free optical isolator active layers (e.g., Ce:TbIG), optimized to give high magnetic gyrotropy, together with a non-reciprocal mode conversion (NRMC) design.

NRMC can be difficult to utilize in SOI platforms due to the birefringence of silicon waveguide structures. However, quasi phase matching (QPM) has been shown to overcome birefringence. QPM is achieved using alternating magneto-optic and non-magneto-optic segments with lengths that match the characteristic beat length of the waveguide bire-fringence. Therefore, not only can NRMC designs use around 500 nm-thick SOI, they actually benefit from thicker waveguides because cross-sections of the designs can be more isotropic. This means that QPM structures can, in principle, be fabricated via photolithography or nano-imprint rather than expensive e-beam lithography for foundry-friendly designs.

The key to enabling NRMC devices is high gyrotropy materials. Ce:TbIG can crystallize on top of Si without an optically-detrimental seedlayer that is needed for other garnets (e.g.: doped YIG). The Faraday rotation of sputter-deposited Ce:TbIG can be optimized using two parameters, annealing temperature and Ce-doping. Annealing parameters are optimized to produce the desired garnet crystallinity in a single step. Ce-doping is optimized by controlling the bias voltage on the Ce target during deposition. Importantly, the NRMC method presented here could also be useful for NRPS devices because the physical phenomenon behind both NRMC and NRPS is magnetic gyrotropy, which is optimized here.

Future integrated photonic circuits may migrate to thicker cores for a number of reasons, especially if the integrated lasers do not scale below around 500 nm. Development of a dual-level SOI platform is extremely challenging, especially the preservation of pristine silicon surfaces for bonding or deposition needed to facilitate low-loss waveguide propagation. It is difficult to meet uniformity and surface etch damage requirements upon partial etching of a thicker SOI core, which could prove problematic when subsequently addressing garnet bonding or garnet precursor deposition. Alternatively, selective area deposition of amorphous silicon can increase the core thickness from the initial SOI thickness (e.g., around 220 nm) but could prove problematic when subsequently addressing III-V bonding for the active elements for a thickened core. In these cases, the only viable isolators proposed to date are the NRMC isolators as described herein.

Cerium Bias Voltage Trend

FIG. 6 shows a data plot 600 of the characteristic fluctuation of bias voltage for cerium corresponding to the oxidation and deoxidation of the surface of a target. This characteristic trend decreased after the 10th minute of the process and bounced back to bias voltages greater than its starting value. Sputtered samples for which this trend was observed have a very high Faraday rotation, typically greater than −3200°/cm. There are two samples in FIG. 6 in which this trend was not observed and their Faraday rotations were correspondingly lower than the expected values.

Cerium-Doped Terbium Iron Garnet

Garnet-clad (with garnet around 500 nm thick) SOI TE-isolators were demonstrated with thicknesses and modal operation commensurate with typical dimensions of integrated lasers for optimal isolation. Integrated isolators normally employ around 220 nm SOI, similar to photonic integrated circuit (PIC) dimensions, but the necessary connecting elements can result in unwanted reflections or excess losses. Although the propagating modes in around 500 nm Si waveguides can interact more weakly with the garnet cladding than those in around 220 nm waveguides, the interaction in this example was strengthened by engineering a seed layer-free garnet with large magnetic gyrotropy. Specifically, seed layer-free Ce-doped terbium iron garnet (Ce:TbIG) films on Si were optimized using annealing temperature and Ce sputtering bias voltage, resulting in repeatable Faraday rotations better than around −3200°/cm. Next, a quasi phase-matched non-reciprocal mode conversion design enabled this material to achieve isolation ratios up to around 11 dB in prototype devices.

Thin films of Ce:TIG around 250±7 nm thick were grown on substrates of around 10 mm×around 10 mm. For example, the substrates included Si, MgO, sapphire, and yttria-stabilized zirconia (YSZ). Once the films were deposited, samples were rapid thermal annealed (RTA) for around 2 minutes. The samples were RTA at temperatures around 900° C., and in an oxygenated environment of, for example, around 10 sccm of $O_2$.

X-ray diffraction measurements were obtained through a θ-2θ coupled mode scan. Faraday rotation was measured in a transmission optical setup at around 1550 nm with a magnetic field of 3500 Oe in the direction of light propagation.

Results and findings of this exemplary experiment can be seen in FIGS. 7-12.

FIG. 7 is a data plot 700 of the x-ray diffraction measurements of Ce:TbIG thin films on different substrates. X-ray diffraction is a characterization technique used to identify the crystalline phases of the material. The measured pattern is compared with a standard from the database to determine whether the material has crystallized in the desired garnet phase. Other secondary phases that are possible may not have the gyrotropic properties. FIG. 7 illustrates that Ce:TbIG can crystallize in the desired phase on a variety of substrates. This indicates that Ce:TbIG can be a great choice in applications that utilize a non-silicon substrate and require a magneto-optic garnet.

FIG. 8 shows two data plots 800, 802 representing the effect of annealing temperature on a particular crystallization process. Samples were sputtered at constant forward power (around 40 W) and annealed at different temperatures. Annealing is the process of converting a material from an amorphous state to a crystalline state. Different temperatures can be used to achieve this process. The X-ray diffraction results shown in FIG. 8 illustrate that at least 850° C. may be used to achieve crystallization in the desired phase. The Faraday rotations on the right panel show that 900° C. is a preferable annealing temperature.

FIG. 9 shows two data plots 900, 902 of the effect of dopant concentration on a particular sputtering process. Samples were sputtered at different forward powers and annealed at a constant temperature of around 900° C. Preferentially substituting cerium in garnets usually increases the Faraday rotation of the garnets. The amount of cerium being introduced may be controlled by the forward sputtering power for the cerium gun. The X-ray diffraction results shown in FIG. 9 illustrate that garnet crystallize in the desired phase regardless of the cerium forward sputtering power. For example, sputtering power of 20 W to 60 W is shown in FIG. 9. The right panel illustrates that about a 10% fraction of cerium substitution may be used to obtain high gyrotropy.

FIG. 10 is a graphical illustration 1000 of the effect of discharge voltage, or bias, or forward power, for a particular sputtering process. The effect of discharge voltage illustrates that a significant difference from the fitted curve is representative of low Faraday rotation in the sample.

FIG. 11 is an illustration 1100 of an exemplary laser integrated with an optical isolator 1102 and a half reciprocal polarization converter.

FIG. 12 is an illustration of the Ce:TbIG thin film on the side and the top of a waveguide. Compositional analysis through a scanning electron microscope shows increase in garnet elements at the sidewall edges of the Si waveguide. Transmission microscopy image shows the select area diffraction and dark field image, which confirms the crystallization of Ce:TbIG on sidewall.

Magnetic gyrotropy in sputter-deposited garnet can be optimized via several methods, including crystallization of the garnet phase and control of doping. In one example, rapid thermal annealing (RTA, around 700° C. to around 1000° C., and around 3 min in $O_2$) was used to crystallize RF magnetron sputtered Ce:TbIG films (around 250±7 nm thick) on Si. The desired garnet phase crystallized at temperatures above around 850° C., as indicated by the X-ray diffraction spectra as illustrated in FIG. 8. FIG. 8 illustrates optimization of annealing temperature: a) X-ray diffraction spectra obtained for Ce:TbIG samples grown at around 40 W cerium sputtering power and annealed at temperatures from 700° C.-1000° C. for around 3 minutes. Optimized crystallization of the garnet phase occurs at around 900° C., after which secondary phases appear (garnet peaks are identified in parentheses), and b) a correspondingly high Faraday rotation was obtained for the sample annealed at around 900° C. (the error bars are calculated from the variations obtained in three consecutive measurements). At higher annealing temperatures, a secondary phase was also observed (peak next to the (420) garnet peak). Although it was difficult to definitively identify this phase from one peak, it could correspond to a lossy ferrite phase that is more likely to form at higher temperatures. The Faraday rotation of the films decreased as this phase formed. Therefore, around 900° C. was chosen for subsequent doping studies, where the films contained crystallized garnet without the secondary phase.

Reactive co-sputtering offers the means to control the concentration of a specific element in the film's composition by varying the corresponding sputtering power. By controlling the amount of Ce dopant in Ce:TbIG, very high Faraday rotations can be obtained. The XRD spectra in FIG. 13 confirms the crystallization of the garnet phase for all Ce sputtering powers.

FIG. 13 is a graphical illustration 1300 of the x-diffraction measurements for different dopant concentrations and variations in fraction dopant substitution, Faraday rotation and bias voltage with forward sputtering power for a particular target material. The experimental results shown in FIG. 13 were obtained using the process for forming magneto-optical materials disclosed herein. Within this garnet phase, the fraction cerium substitution (Ce/(Ce+Tb)) increased with Ce power, in FIG. 13(*b*). The Faraday rotation measurements for these samples showed a steady increase to around −3200±200°/cm corresponding to around 40 W after which the rotation was relatively constant as seen in FIG. 13(*c*). Thus far, this is the highest reported Faraday rotation for a garnet film on a non-garnet substrate without a seed layer. It appeared that a forward sputtering power of around 40 W was the optimum process condition to obtain high Faraday rotation. However, Faraday rotation measurements from additional samples sputtered under similar conditions at around 40 W resulted in a few exceptions with significantly lower rotations.

FIG. 13 illustrates optimization of Ce-doping: (a) XRD spectra of Ce:TbIG annealed at around 900° C. with various cerium dopant concentrations corresponding to change in Ce sputtering power from around 20-60 W (garnet peaks are identified in parentheses), (b) Increase in fraction cerium substitution (Ce/(Ce+Tb)) with higher cerium sputtering powers, (c) Faraday rotation measurements show that very large rotation values (>around −3200°/cm) are obtained at around 40 W of forward sputtering power. The outlier is the exception with low Faraday rotation, (d) Variation of the bias voltage at cerium target for different sputtering powers. The distribution of bias voltages at around 40 W is comparable to the distribution of Faraday rotation at around 40 W. The outlier corresponds to the low rotation sample, (e)

Room temperature M-H loop for the in-plane measurement directions show desirable magnetic properties for an optimal Ce:TbIG sample sputtered at around 40 W Ce.

A subsequent study focused on addressing this abnormal distribution in Faraday rotation at around 40 W. It was revealed that the bias voltage at the cerium target during sputtering was the primary factor in reproducing high Faraday rotation. The plot of bias voltage versus forward sputtering power in FIG. 13(*d*) showed that tightly controlled bias voltage resulted in high Faraday rotations. Deviations from this trend resulted in samples with low rotation values, as in the case of the outlier in FIGS. 13(*c*) and 13(*d*).

FIG. 13(*e*) shows the room-temperature in-plane M-H loops measurement for Ce:TbIG with a saturation magnetization (MS) of around 18 emu/cc. The large coercivity and remanence along with the shape anisotropy allows for the material to be an ideal candidate of latched or magnetless isolators. A low saturation magnetization material will also have lower stray fields in contrast to other garnets used in isolator designs whose MS exceeds around 100 emu/cc.

One-dimensional (1D) waveguide isolators were fabricated with alternating segments of Ce:TbIG cladding on around 500 nm×around 900 nm Si waveguides. The phase-matching beat lengths were identified to be around 21 μm (around 10.5 μm Ce:TbIG/around 10.5 μm $Si_xN_y$). Although these structures were defined by e-beam lithography, the dimensions are commensurate with fabrication via photolithography or nano-imprint for eventual foundry-friendly devices. Optical losses were estimated at a wavelength of around 1550 nm using the Fabry-Perot technique giving TM and TE losses of around 14.7 and around 11.2 dB/cm, respectively. Referring back to FIG. 5, the TE-TM mode conversion efficiency after saturating in a longitudinal magnetic field (>around 1.2 kOe) is shown in FIG. 14. FIG. 14 illustrates a wavelength scan to detect the TM mode output with TE mode laser source. The peak in output percentage for around 1511 nm corresponds to TE to TM mode conversion due to the Faraday Effect. FIG. 14 also illustrates a comparison of isolation and optimal length of the device for different magneto-optical cladding materials. The device with Ce:TbIG cladding has the largest isolation ratio.

Referring now to FIG. 14, this NRMC exhibited a peak when the phase-matching criterion was satisfied, and the shape of this peak was commensurate with the expected sine cardinal (sinc) for phase-matched coherent mode conversion. Upon comparing the traces before and after saturation, no TE-TM conversion occurred before saturation which implies an absence of periodic loading which could cause reciprocal conversion between TE and TM modes. Therefore, the peak obtained on saturation is attributed to mode conversion arising solely from magneto-optical NRMC.

FIG. 14 illustrates non-reciprocal mode conversion measurements 1400: (b) Isolation ratio calculated from the Stokes vector angle shows that for 1*T radians* the isolation ratio is maximum. The values measured for devices shown in FIG. 15 are superimposed on the theoretical result, and (d) Cross section scanning electron microscope (SEM) image of the around 500 nm waveguide isolator with Ce:TbIG cladding.

Next, QPM claddings of various garnets were deposited on around 500 nm SOI. The angles between input and output Stokes vectors (8) and the isolation ratios ($d_m$) were described previously. In short, the devices were cleaved for measurement, with lengths are given in FIG. 15. From the difference in Stokes vectors of input vs. output, the optimal length ($L_{optimal}$) needed for the ideal Stokes vector angles of π was calculated. This length would correspond to conditions where the light waves of opposite propagation directions are orthogonal to each other at the laser so around 100% isolation can be achieved. The isolation ratio for the fabricated device was calculated from the Stokes vector angle. FIG. 14(*b*) shows the calculated isolation ratios from their corresponding Stokes vector angle superimposed on the curve. It is seen that very high isolation ratios (>around 50 dB) can be obtained for the near ideal Stokes vector angle of π radians.

FIG. 15 shows the achieved isolation ratio and projected the Loptimal results 1500 for devices fabricated on around 500 nm SOI platforms with different garnet claddings. Bi:TbIG has been measured to have lower Faraday rotation (around −500°/cm), and yet QPM claddings could produce full isolation if the isolator length could be extended to around 2 cm. Note, such lengths have been achieved using windings that would equal the size of other proposed 2D isolator designs. Ce:YIG/MgO claddings produced marginally higher isolation ratio but still needs around 13.7 mm to achieve π between the Stokes vectors. Ce:YIG on YIG seed layers has been measured to have the largest Faraday rotation possible on Si substrates (around −3700°/cm). QPM claddings of this garnet had considerably better isolation of around 8.0 dB with the shortest optimal length of around 5.5 mm. However, the undoped YIG seed layer is required for this garnet, which means two-step lithography (resist application, mask alignment, development, garnet sputtering, lift-off, anneal, repeat). Ce:TbIG had very good isolation (around 10.9 dB) and much higher ratios would be possible for π Stokes vector angles at only around 7.35 mm. Considering the convenience of one-step garnet deposition, Ce:TbIG (FIG. 14(*d*)) is a foundry-friendly integrated isolator.

Waveguide isolators on around 500 nm SOI, matching the dimension and modal operation of currently-available integrated lasers, can be realized with a high magnetic gyrotropy material like Ce:TbIG. Consistently high Faraday rotations of around −3200°/cm are achieved with the optimization of annealing temperature and tight control of bias voltage at the cerium target. The feasibility of around 500 nm isolators has been demonstrated with prototype devices, and Ce:TbIG cladded isolators had the best trade-off between fabrication ease and isolation. The prototype device had an isolation ratio of around 11 dB, which can be improved by designing the devices at the projected $L_{optimal}$ to give a Stokes vector angle of π. The 1D waveguide isolators shown here can provide the high device density needed for large scale on-chip integration that is crucial for future silicon photonics.

Ce:TbIG thin films were sputter deposited on double side polished silicon substrates (around 10 mm×around 10 mm) using reactive RF magnetron co-sputtering at a base pressure of around 2.5 mTorr in an ambient environment of an argon and oxygen mixture. The sputtering power of cerium target was varied to change the concentration of cerium in the films. Post deposition the samples were subjected to ex-situ rapid thermal annealing for around 3 mins in around 10 sccm of $O_2$ at temperatures ranging from around 700° C.-around 1000° C. The thickness of the samples was around 250±7 nm.

The devices were fabricated using e-beam lithography. Two layers of PMMA (positive resist) were spin-coated and patterned to make the lift-off mask on SOI for Ce:TbIG deposition. The bi-layer PMMA was removed using a conventional lift-off procedure. A $Si_xN_y$ substrate (around 100 nm thick and having the same refractive index as garnet) was uniformly coated using ICP-CVD (Inductively Coupled Plasma Chemical Vapor Deposition) to eliminate the periodic loading effect. To pattern the Si waveguides, Hydrogen silsesquioxane (HSQ) was spun on the wafer and then etched using a STS-ICP dry etch tool down to the oxide.

Faraday rotation measurements were carried out at around 1550 nm infrared telecommunications S- or C-bands with the laser source in the transmission setup and a unidirectional magnetic field. The direction of the field was alternated to measure the Faraday Effect as a difference between the TE and TM modes. The acquired data from the photodetectors in mV was converted to degrees using a calibration step and normalized to the sample thickness to obtain the Faraday rotation in °/cm.

The TE-TM mode conversion efficiency was measured by scanning the wavelength with a lock-in amplifier on a cleaved sample to form a Fabry-Perot cavity. The direction of the saturating magnetic field was alternated during the measurement to effectively measure non-reciprocal effects. TE mode light is injected into the sample and the TM output is measured using a lock-in amplifier under three conditions: no magnetic field, after saturation in a magnetic field (around 1.2 kOe) in the forward direction, and in the reverse direction. A polarimeter was used to observe and record the three Stokes parameters (S1, S2 and S3) and the azimuth.

FIG. 17 is an image from an electron backscatter diffraction (EBSD) imaging technique illustrating the improved quality of material obtained using a process for forming magneto-optical material, as disclosed herein. Electron backscatter diffraction (EBSD) imaging is a technique used to identify the crystallinity of a thin film. EBSD images of Ce:TbIG reveal fully crystallized garnet phase with polycrystalline orientation. FIG. 17 shows an EBSD map of Ce:TbIG on Si substrate and CeTbIG on Si waveguides. The forward sputtering powers (2" diameter targets) were 220 W for iron, 110 W for Tb and 40 W for Ce. A combination of argon and oxygen in a 10:1 ratio was used. The bias voltage was monitored and corrective actions as previously described were taken when the bias voltage began decreasing. Annealing occurred at 900 C for 3 minutes with a ramp up rate of 45° C./second and a ramp down rate of 15° C./second. The shaded regions 1702 indicate that the expected garnet phase is accurately identified.

Yttrium Iron Garnet

Yttrium Iron Garnet (YIG) is a rare-earth iron garnet like the garnets discussed previously with applications in both optics and spintronics. YIG, also known as a magnetic insulator, has the unique property of conducting spins and insulating electrons. This property enables the material to act as a spin valve where spin transport can be controlled using external magnetic field or electric pulses. These properties are typically measured using ferromagnetic resonance experiments, where a microwave pulse is used to excite the spins inside the material. Parameters like the damping factor (a), inhomogeneous broadening, and g-factor are indicators of the quality of the material for the spin transport applications.

Measuring and monitoring the bias voltage is not necessary for YIG. However, the sputtering process and annealing process discussed in this specification is used for YIG. Sputtering of YIG happens at a forward sputtering power of 240 W from a FeY allow target. A combination of argon and oxygen is used in 10:1 ratio. Annealing happens at 900° C. for 3 minutes with a ramp up rate of 45° C./second and a ramp down rate of 15° C./second.

YIG, a rare-earth iron oxide, has narrow linewidth and a low damping parameter. Ferromagnetic resonance (FMR) measurements were performed on reactively sputtered YIG (around 50 nm)/GGG from a composite target in an argon and oxygenated ambient environment. Exemplary results of this experiment 1602, 1604, 1606 are illustrated in FIGS. 16A-C and demonstrate the narrow linewidth and low damping parameter of YIG and a four-fold symmetry consistent with the cubic lattice structure of the material. FIG. 16C uses a damping (a) of $6.22 \times 10^{-4}$, an inhomogeneous broadening ($\Delta H_0$) of 3.52 Oe, a cubic anisotropy ($H_k$) of 40.1 Oe, a g-factor of 1.93, and a saturation magnetization ($M_s$) of 132 emu/cc.

A number of embodiments have been described. Nevertheless, it will be understood that various modifications may be made without departing from the spirit and scope of the invention. Accordingly, other embodiments are within the scope of the claims.

What is claimed is:

1. A method of fabricating a gyrotropic device, the method comprising:

providing a substrate; and forming an optical isolator active layer on the substrate, wherein forming the optical isolator active layer comprises:

for a specified composition of the optical isolator active layer, deriving at least one sputtering process parameter;

performing radio-frequency sputtering of at least one target according to the at least one sputtering process parameter to deposit the optical isolator active layer on the substrate;

measuring a first value of a bias voltage at a first target of the at least one target;

during deposition of the optical isolator active layer, monitoring the bias voltage; and in response to the monitored bias voltage, adjusting a sputtering process parameter distinct from the bias voltage, wherein the adjustment maintains the bias voltage within a target range that includes the first value.

2. The method of claim 1, wherein adjusting the sputtering process parameter comprises (a) adjusting a forward power associated with sputtering the first target of the at least one target, (b) closing a shutter to prevent deposition of material from the first target on the substrate, or (c) adjusting the forward power associated with sputtering the first target and closing the shutter to prevent deposition of material from the first target on the substrate.

3. The method of claim 1, wherein the optical isolator active layer has a magnitude of Faraday rotation greater than 3000°/cm for a predetermined wavelength of light.

4. The method of claim 1, wherein the substrate comprises a waveguide layer and the optical isolator active layer is a cladding to the waveguide layer.

5. The method of claim 1, wherein the optical isolator active layer comprises doped garnet.

6. The method of claim 5, wherein the doped garnet is a waveguide layer.

7. The method of claim 1, wherein the optical isolator active layer comprises doped terbium iron garnet.

8. The method of claim 7, wherein the doped terbium iron garnet is doped with cerium.

9. The method of claim 1, wherein forming the optical isolator active layer comprises annealing the optical isolator active layer.

10. The method of claim 9, wherein annealing the optical isolator active layer is performed at a temperature between about 850 and about 970 degrees Celsius.

11. The method of claim 1, wherein forming the optical isolator active layer comprises performing the radio-frequency sputtering in an oxygen environment.

12. The method of claim 1, wherein the at least one target comprises a cerium target, a terbium target, and an iron target.

13. The method of claim 1, wherein at least one of the at least one target comprises an alloy of terbium and iron.

14. The method of claim 1, wherein at least one of the at least one target comprises cerium.

15. The method of claim 1, further comprising forming a silicon nitride layer on the optical isolator active layer.

16. The method of claim 1, wherein adjusting the sputtering process parameter comprises increasing a forward power associated with sputtering the first target until the bias voltage satisfies a condition.

17. The method of claim 1, wherein, during the radio-frequency sputtering, the bias voltage exhibits a drop to a value less than the first value, and, after the drop, a rise to a value greater than the first value.

18. The method of claim 1, wherein the first target comprises cerium.

19. The method of claim 1, wherein the optical isolator active layer has a magnitude of Faraday rotation greater than 500°/cm for a predetermined wavelength of light.

* * * * *